(12) United States Patent
Eid et al.

(10) Patent No.: US 8,059,088 B2
(45) Date of Patent: Nov. 15, 2011

(54) METHODS AND SYSTEMS FOR PROVIDING HAPTIC MESSAGING TO HANDHELD COMMUNICATION DEVICES

(75) Inventors: Jeffrey Eid, Danville, CA (US); Shoichi Endo, Cupertino, CA (US); Danny A. Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 67 days.

(21) Appl. No.: 11/226,915

(22) Filed: Sep. 13, 2005

(65) Prior Publication Data
US 2007/0057913 A1    Mar. 15, 2007

Related U.S. Application Data

(63) Continuation-in-part of application No. 10/538,160, filed as application No. PCT/US03/038899 on Dec. 8, 2003, now abandoned.

(60) Provisional application No. 60/431,662, filed on Dec. 8, 2002.

(51) Int. Cl.
  *G09G 5/00* (2006.01)
(52) U.S. Cl. ...... 345/156; 345/173; 345/204; 455/556.1
(58) Field of Classification Search .................. 345/156, 345/173, 204, 169; 455/556.2, 556.1, 566, 455/567
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,875,488 A | 4/1975 | Crocker et al. | |
| 3,902,687 A | 9/1975 | Hightower | |
| 3,903,614 A | 9/1975 | Diamond et al. | |
| 3,911,416 A | 10/1975 | Feder | |
| 3,919,691 A | 11/1975 | Noll | |
| 3,923,166 A | 12/1975 | Fletcher et al. | |
| 4,023,290 A | 5/1977 | Josephson | |

(Continued)

FOREIGN PATENT DOCUMENTS

DE    19911416    11/2000

(Continued)

OTHER PUBLICATIONS

International Search Report; Apr. 12, 2004; 2 pgs.

(Continued)

*Primary Examiner* — Kimnhung Nguyen
(74) *Attorney, Agent, or Firm* — Womble Carlyle Sandridge & Rice, PLLC

(57) ABSTRACT

Embodiments of the invention relate to methods and systems for providing customized "haptic messaging" to users of handheld communication devices in a variety of applications. In one embodiment, a method of providing haptic messaging to a hand communication device includes: associating an input signal with an event; determining a source of the event and selecting the control signal based on the determination; and outputting a control signal to an actuator coupled to the hand communication device. The control signal is configured to cause the actuator to output a haptic effect associated with the event. An event in the above may be a connection event.

20 Claims, 16 Drawing Sheets

U.S. PATENT DOCUMENTS

| | | |
|---|---|---|
| 4,101,884 A | 7/1978 | Benton, Jr. |
| 4,108,146 A | 8/1978 | Golden |
| 4,108,164 A | 8/1978 | Hall, Sr. |
| 4,127,752 A | 11/1978 | Lowthorp |
| 4,160,508 A | 7/1979 | Salisbury et al. |
| 4,236,325 A | 12/1980 | Hall et al. |
| 4,242,823 A | 1/1981 | Bruno |
| 4,262,549 A | 4/1981 | Schwellenbach |
| 4,333,070 A | 6/1982 | Barnes |
| 4,334,280 A | 6/1982 | McDonald |
| 4,398,889 A | 8/1983 | Lam et al. |
| 4,414,537 A | 11/1983 | Grimes |
| 4,414,984 A | 11/1983 | Zarudiansky |
| 4,436,188 A | 3/1984 | Jones |
| 4,464,117 A | 8/1984 | Foerst |
| 4,477,043 A | 10/1984 | Repperger |
| 4,484,179 A | 11/1984 | Kasday |
| 4,484,191 A | 11/1984 | Vavra |
| 4,513,235 A | 4/1985 | Acklam et al. |
| 4,542,375 A | 9/1985 | Alles et al. |
| 4,545,023 A | 10/1985 | Mizzi |
| 4,550,221 A | 10/1985 | Mabusth |
| 4,557,275 A | 12/1985 | Dempsey, Jr. |
| 4,560,983 A | 12/1985 | Williams |
| 4,581,491 A | 4/1986 | Boothroyd |
| 4,584,625 A | 4/1986 | Kellogg |
| 4,599,070 A | 7/1986 | Hladky et al. |
| 4,603,284 A | 7/1986 | Perzley |
| 4,604,016 A | 8/1986 | Joyce |
| 4,689,449 A | 8/1987 | Rosen |
| 4,692,756 A | 9/1987 | Clark |
| 4,706,294 A | 11/1987 | Ouchida |
| 4,708,656 A | 11/1987 | de Vries et al. |
| 4,713,007 A | 12/1987 | Alban |
| 4,715,235 A | 12/1987 | Fukui et al. |
| 4,757,453 A | 7/1988 | Nasiff |
| 4,758,165 A | 7/1988 | Tieman et al. |
| 4,763,356 A | 8/1988 | Day, Jr. et al. |
| 4,771,344 A | 9/1988 | Fallacaro et al. |
| 4,772,205 A | 9/1988 | Chlumsky et al. |
| 4,782,327 A | 11/1988 | Kley et al. |
| 4,791,416 A | 12/1988 | Adler |
| 4,794,384 A | 12/1988 | Jackson |
| 4,794,392 A | 12/1988 | Selinko |
| 4,795,296 A | 1/1989 | Jau |
| 4,800,721 A | 1/1989 | Cemenska et al. |
| 4,821,030 A | 4/1989 | Batson et al. |
| 4,823,634 A | 4/1989 | Culver |
| 4,837,734 A | 6/1989 | Ichikawa et al. |
| 4,839,838 A | 6/1989 | LaBiche et al. |
| 4,851,820 A | 7/1989 | Fernandez |
| 4,853,874 A | 8/1989 | Iwamoto et al. |
| 4,861,269 A | 8/1989 | Meenen, Jr. |
| 4,868,549 A | 9/1989 | Affinito et al. |
| 4,871,992 A | 10/1989 | Petersen |
| 4,885,565 A | 12/1989 | Embach |
| 4,891,764 A | 1/1990 | McIntosh |
| 4,896,554 A | 1/1990 | Culver |
| 4,906,843 A | 3/1990 | Jones et al. |
| 4,914,624 A | 4/1990 | Dunthorn |
| 4,926,879 A | 5/1990 | Sevrain et al. |
| 4,930,770 A | 6/1990 | Baker |
| 4,934,694 A | 6/1990 | McIntosh |
| 4,935,728 A | 6/1990 | Kley |
| 4,949,119 A | 8/1990 | Moncrief et al. |
| 4,961,038 A | 10/1990 | MacMinn |
| 4,977,298 A | 12/1990 | Fujiyama |
| 4,983,901 A | 1/1991 | Lehmer |
| 5,004,391 A | 4/1991 | Burdea |
| 5,007,300 A | 4/1991 | Siva |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,065,145 A | 11/1991 | Purcell |
| 5,076,517 A | 12/1991 | Ferranti et al. |
| 5,078,152 A | 1/1992 | Bond |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,180 A | 5/1992 | Fung et al. |
| 5,121,091 A | 6/1992 | Fujiyama |
| 5,133,076 A | 7/1992 | Hawkins et al. |
| 5,139,261 A | 8/1992 | Openiano |
| 5,143,505 A | 9/1992 | Burdea et al. |
| 5,146,566 A | 9/1992 | Hollis, Jr. et al. |
| 5,159,159 A | 10/1992 | Asher |
| 5,165,897 A | 11/1992 | Johnson |
| 5,172,092 A | 12/1992 | Nguyen et al. |
| 5,175,459 A | 12/1992 | Danial et al. |
| 5,184,319 A | 2/1993 | Kramer |
| 5,184,868 A | 2/1993 | Nishiyama |
| 5,185,561 A | 2/1993 | Good et al. |
| 5,186,629 A | 2/1993 | Rohen |
| 5,186,695 A | 2/1993 | Mangseth et al. |
| 5,189,355 A | 2/1993 | Larkins et al. |
| 5,193,963 A | 3/1993 | McAffee et al. |
| 5,197,003 A | 3/1993 | Moncrief et al. |
| 5,203,563 A | 4/1993 | Loper, III |
| 5,212,473 A | 5/1993 | Louis |
| 5,220,260 A | 6/1993 | Schuler |
| 5,223,658 A | 6/1993 | Suzuki |
| 5,223,776 A | 6/1993 | Radke et al. |
| 5,235,868 A | 8/1993 | Culver |
| 5,237,327 A | 8/1993 | Saitoh et al. |
| 5,240,417 A | 8/1993 | Smithson et al. |
| 5,262,777 A | 11/1993 | Low et al. |
| 5,264,768 A | 11/1993 | Gregory et al. |
| 5,270,710 A | 12/1993 | Gaultier et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |
| 5,286,203 A | 2/1994 | Fuller et al. |
| 5,296,871 A | 3/1994 | Paley |
| 5,299,810 A | 4/1994 | Pierce |
| 5,302,132 A | 4/1994 | Corder |
| 5,309,140 A | 5/1994 | Everett |
| 5,313,230 A | 5/1994 | Venolia et al. |
| 5,316,017 A | 5/1994 | Edwards et al. |
| 5,334,027 A | 8/1994 | Wherlock |
| 5,341,459 A | 8/1994 | Backes |
| 5,354,162 A | 10/1994 | Burdea et al. |
| 5,355,148 A | 10/1994 | Anderson |
| 5,376,948 A | 12/1994 | Roberts et al. |
| 5,381,080 A | 1/1995 | Schnell et al. |
| 5,389,849 A | 2/1995 | Asano et al. |
| 5,389,865 A | 2/1995 | Jacobus et al. |
| 5,396,266 A | 3/1995 | Brimhall |
| 5,398,044 A | 3/1995 | Hill |
| 5,399,091 A | 3/1995 | Mitsumoto |
| 5,405,152 A | 4/1995 | Katanics et al. |
| 5,414,337 A | 5/1995 | Schuler |
| 5,432,531 A | 7/1995 | Calder et al. |
| 5,436,622 A | 7/1995 | Gutman et al. |
| 5,437,607 A | 8/1995 | Taylor |
| 5,450,613 A | 9/1995 | Takahara et al. |
| 5,451,924 A | 9/1995 | Massimino et al. |
| 5,457,479 A | 10/1995 | Cheng |
| 5,459,382 A | 10/1995 | Jacobus et al. |
| 5,461,711 A | 10/1995 | Wang et al. |
| 5,466,213 A | 11/1995 | Hogan |
| 5,471,571 A | 11/1995 | Smith et al. |
| 5,473,235 A | 12/1995 | Lance et al. |
| 5,473,344 A | 12/1995 | Bacon et al. |
| 5,491,477 A | 2/1996 | Clark et al. |
| 5,506,605 A | 4/1996 | Paley |
| 5,512,919 A | 4/1996 | Araki |
| 5,513,100 A | 4/1996 | Parker et al. |
| 5,521,336 A | 5/1996 | Buchanan et al. |
| 5,530,455 A | 6/1996 | Gillick et al. |
| 5,542,672 A | 8/1996 | Meredith |
| 5,547,382 A | 8/1996 | Yamasaki |
| 5,557,365 A | 9/1996 | Ohsawa |

| Patent No. | Date | Inventor(s) |
|---|---|---|
| 5,562,707 A | 10/1996 | Prochazka et al. |
| 5,563,632 A | 10/1996 | Roberts |
| 5,565,887 A | 10/1996 | McCambridge et al. |
| 5,575,761 A | 11/1996 | Hajianpour |
| 5,576,727 A | 11/1996 | Rosenberg et al. |
| 5,577,981 A | 11/1996 | Jarvik |
| 5,580,251 A | 12/1996 | Gilkes et al. |
| 5,583,407 A | 12/1996 | Yamaguchi |
| 5,587,937 A | 12/1996 | Massie et al. |
| 5,589,828 A | 12/1996 | Armstrong |
| 5,589,854 A | 12/1996 | Tsai |
| 5,591,082 A | 1/1997 | Jensen et al. |
| 5,596,347 A | 1/1997 | Robertson et al. |
| 5,600,777 A | 2/1997 | Wang et al. |
| 5,619,180 A | 4/1997 | Massimino et al. |
| 5,625,576 A | 4/1997 | Massie et al. |
| 5,629,594 A | 5/1997 | Jacobus et al. |
| 5,638,060 A | 6/1997 | Kataoka et al. |
| 5,642,469 A | 6/1997 | Hannaford et al. |
| 5,643,087 A | 7/1997 | Marcus et al. |
| 5,644,516 A | 7/1997 | Podwalny et al. |
| 5,656,901 A | 8/1997 | Kurita |
| 5,666,138 A | 9/1997 | Culver |
| 5,666,473 A | 9/1997 | Wallace |
| 5,670,755 A | 9/1997 | Kwon |
| 5,690,582 A | 11/1997 | Ulrich et al. |
| 5,691,747 A | 11/1997 | Amano |
| 5,691,898 A | 11/1997 | Rosenberg et al. |
| 5,694,013 A | 12/1997 | Stewart et al. |
| 5,699,059 A | 12/1997 | Hiller |
| 5,709,219 A | 1/1998 | Chen et al. |
| 5,714,978 A | 2/1998 | Yamanaka |
| 5,719,561 A | 2/1998 | Gonzales |
| 5,721,566 A | 2/1998 | Rosenberg et al. |
| 5,724,106 A | 3/1998 | Autry et al. |
| 5,724,278 A | 3/1998 | Ohgose et al. |
| 5,729,249 A | 3/1998 | Yasutake |
| 5,731,804 A | 3/1998 | Rosenberg |
| 5,732,347 A | 3/1998 | Bartle et al. |
| 5,734,373 A | 3/1998 | Rosenberg et al. ............ 345/161 |
| 5,736,978 A | 4/1998 | Hasser et al. |
| 5,739,811 A | 4/1998 | Rosenberg et al. |
| 5,742,278 A | 4/1998 | Chen et al. |
| 5,745,715 A | 4/1998 | Pickover et al. |
| 5,748,185 A | 5/1998 | Stephan et al. |
| 5,754,023 A | 5/1998 | Roston et al. |
| 5,755,577 A | 5/1998 | Gillio |
| 5,757,358 A | 5/1998 | Osga |
| 5,760,764 A | 6/1998 | Martinelli |
| 5,766,016 A | 6/1998 | Sinclair et al. |
| 5,767,457 A | 6/1998 | Gerpheide et al. |
| 5,767,839 A | 6/1998 | Rosenberg |
| 5,769,640 A | 6/1998 | Jacobus et al. |
| 5,771,037 A | 6/1998 | Jackson |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean et al. |
| 5,791,992 A | 8/1998 | Crump et al. |
| 5,802,353 A | 9/1998 | Avila et al. |
| 5,804,780 A | 9/1998 | Bartha |
| 5,805,140 A | 9/1998 | Rosenberg et al. |
| 5,805,165 A | 9/1998 | Thorne, III et al. |
| 5,805,416 A | 9/1998 | Friend et al. |
| 5,805,601 A | 9/1998 | Takeda et al. |
| 5,808,601 A | 9/1998 | Leah et al. |
| 5,808,603 A | 9/1998 | Chen |
| 5,821,921 A | 10/1998 | Osborn et al. |
| 5,823,876 A | 10/1998 | Unbehand |
| 5,825,308 A | 10/1998 | Rosenberg |
| 5,828,197 A | 10/1998 | Martin |
| 5,828,364 A | 10/1998 | Siddiqui |
| 5,831,408 A | 11/1998 | Jacobus et al. |
| 5,832,386 A | 11/1998 | Nojima et al. |
| 5,835,080 A | 11/1998 | Beeteson et al. |
| 5,844,392 A | 12/1998 | Peurach et al. |
| 5,844,506 A | 12/1998 | Binstead |
| 5,877,748 A | 3/1999 | Redlich |
| 5,880,714 A | 3/1999 | Rosenberg et al. |
| 5,884,029 A | 3/1999 | Brush, II et al. |
| 5,887,995 A | 3/1999 | Holehan |
| 5,889,236 A | 3/1999 | Gillespie et al. |
| 5,889,670 A | 3/1999 | Schuler et al. |
| 5,896,125 A | 4/1999 | Niedzwiecki |
| 5,897,437 A | 4/1999 | Nishiumi et al. |
| 5,903,257 A | 5/1999 | Nishiumi et al. |
| 5,907,615 A | 5/1999 | Kaschke ........................ 379/433 |
| 5,912,661 A | 6/1999 | Siddiqui |
| 5,914,705 A | 6/1999 | Johnson et al. |
| 5,914,708 A | 6/1999 | LaGrange et al. |
| 5,917,906 A | 6/1999 | Thornton ........................ 379/433 |
| 5,929,846 A | 7/1999 | Rosenberg et al. |
| 5,942,733 A | 8/1999 | Allen et al. |
| 5,943,044 A | 8/1999 | Martinelli et al. |
| 5,944,151 A | 8/1999 | Jakobs et al. |
| 5,953,413 A | 9/1999 | Peyer et al. |
| 5,956,016 A | 9/1999 | Kuenzner et al. |
| 5,956,484 A | 9/1999 | Rosenberg et al. |
| 5,959,613 A | 9/1999 | Rosenberg et al. |
| 5,973,670 A | 10/1999 | Barber et al. |
| 5,973,689 A | 10/1999 | Gallery |
| 5,977,867 A | 11/1999 | Blouin |
| 5,982,304 A | 11/1999 | Selker et al. |
| 5,982,352 A | 11/1999 | Pryor |
| 5,984,785 A | 11/1999 | Takeda et al. |
| 5,986,643 A | 11/1999 | Harvill et al. |
| 5,988,902 A | 11/1999 | Holehan |
| 5,990,869 A | 11/1999 | Kubica et al. |
| 5,999,168 A | 12/1999 | Rosenberg et al. |
| 6,001,014 A | 12/1999 | Ogata et al. |
| 6,004,134 A | 12/1999 | Marcus et al. |
| 6,005,551 A | 12/1999 | Osborne et al. |
| 6,008,800 A | 12/1999 | Pryor |
| 6,018,711 A | 1/2000 | French-St. George et al. ............................ 704/275 |
| 6,020,876 A | 2/2000 | Rosenberg et al. |
| 6,024,576 A | 2/2000 | Bevirt et al. |
| 6,028,531 A | 2/2000 | Wanderlich |
| 6,028,593 A | 2/2000 | Rosenberg et al. ............ 345/156 |
| 6,037,927 A | 3/2000 | Rosenberg |
| 6,061,004 A | 5/2000 | Rosenberg |
| 6,067,081 A | 5/2000 | Hahlganss et al. |
| 6,071,194 A | 6/2000 | Sanderson et al. ............... 463/37 |
| 6,072,475 A | 6/2000 | van Ketwich et al. |
| 6,081,536 A | 6/2000 | Gorsuch et al. |
| 6,084,587 A | 7/2000 | Tarr et al. |
| 6,088,017 A | 7/2000 | Tremblay et al. |
| 6,088,019 A | 7/2000 | Rosenberg |
| 6,094,565 A | 7/2000 | Alberth et al. |
| 6,100,874 A | 8/2000 | Schena et al. |
| 6,102,803 A | 8/2000 | Takeda et al. |
| 6,110,130 A | 8/2000 | Kramer |
| 6,111,577 A | 8/2000 | Zilles et al. |
| 6,118,435 A | 9/2000 | Fujita et al. |
| 6,125,264 A | 9/2000 | Watanabe et al. |
| 6,125,385 A | 9/2000 | Wies et al. |
| 6,128,006 A | 10/2000 | Rosenberg |
| 6,131,097 A | 10/2000 | Peurach et al. |
| 6,140,987 A | 10/2000 | Stein et al. |
| 6,147,422 A | 11/2000 | Delson et al. |
| 6,147,674 A | 11/2000 | Rosenberg et al. |
| 6,151,332 A | 11/2000 | Gorsuch et al. |
| 6,154,201 A | 11/2000 | Levin et al. |
| 6,160,489 A * | 12/2000 | Perry et al. ...................... 340/7.6 |
| 6,161,126 A | 12/2000 | Wies et al. ....................... 709/203 |
| 6,166,723 A | 12/2000 | Schena et al. |
| 6,169,540 B1 | 1/2001 | Rosenberg et al. ............ 345/326 |
| 6,171,191 B1 | 1/2001 | Ogata et al. |
| 6,178,157 B1 | 1/2001 | Berg et al. |
| 6,184,868 B1 | 2/2001 | Shahoian |
| 6,198,206 B1 | 3/2001 | Saarmaa et al. |
| 6,215,778 B1 | 4/2001 | Lomp et al. |
| 6,218,966 B1 | 4/2001 | Goodwin et al. |
| 6,219,032 B1 | 4/2001 | Rosenberg et al. |
| 6,219,034 B1 | 4/2001 | Elbing et al. |
| 6,236,647 B1 | 5/2001 | Amalfitano |
| 6,239,790 B1 | 5/2001 | Martinelli et al. |
| 6,243,080 B1 | 6/2001 | Molne |

| | | |
|---|---|---|
| 6,262,717 B1 | 7/2001 | Donohue et al. |
| 6,262,718 B1 | 7/2001 | Findlay et al. |
| 6,292,174 B1 | 9/2001 | Mallett et al. ................. 345/163 |
| 6,300,936 B1 | 10/2001 | Braun et al. |
| 6,307,465 B1 | 10/2001 | Kayama et al. |
| 6,323,846 B1 | 11/2001 | Westerman et al. |
| 6,326,901 B1 | 12/2001 | Gonzales |
| 6,332,075 B1 | 12/2001 | Verdonk |
| 6,337,678 B1 | 1/2002 | Fish |
| 6,359,550 B1 | 3/2002 | Brisebois et al. .......... 340/407.1 |
| 6,373,463 B1 | 4/2002 | Beeks |
| 6,388,655 B1 | 5/2002 | Leung |
| 6,388,999 B1 | 5/2002 | Gorsuch et al. |
| 6,411,198 B1 | 6/2002 | Hirai et al. |
| 6,411,276 B1 | 6/2002 | Braun et al. |
| 6,414,674 B1 | 7/2002 | Kamper et al. |
| 6,415,138 B2 | 7/2002 | Sirola et al. |
| 6,418,323 B1 | 7/2002 | Bright et al. |
| 6,422,941 B1 | 7/2002 | Thorner et al. |
| 6,424,356 B2 | 7/2002 | Chang et al. |
| 6,429,846 B2 | 8/2002 | Rosenberg et al. |
| 6,435,794 B1 | 8/2002 | Springer ........................... 414/5 |
| 6,438,390 B1 | 8/2002 | Awan |
| 6,438,392 B1 | 8/2002 | Toba |
| 6,441,599 B1 | 8/2002 | Kropidlowski ................. 324/67 |
| 6,445,284 B1 | 9/2002 | Cruz-Hernandez et al. |
| 6,447,069 B1 | 9/2002 | Terris et al. |
| 6,448,977 B1 | 9/2002 | Braun et al. |
| 6,469,695 B1 | 10/2002 | White |
| 6,473,069 B1 | 10/2002 | Gerpheide |
| 6,487,421 B2 | 11/2002 | Hess et al. |
| 6,509,892 B1 | 1/2003 | Cooper et al. |
| 6,518,958 B1 | 2/2003 | Miyajima et al. |
| 6,525,749 B1 | 2/2003 | Moran et al. |
| 6,529,122 B1 | 3/2003 | Magnussen et al. |
| 6,535,201 B1 | 3/2003 | Cooper et al. |
| 6,563,487 B2 | 5/2003 | Martin |
| 6,574,489 B1 * | 6/2003 | Uriya ........................... 455/567 |
| 6,606,508 B2 | 8/2003 | Becker et al. |
| 6,610,936 B2 | 8/2003 | Gillespie et al. |
| 6,626,358 B1 | 9/2003 | Breimesser et al. .......... 235/380 |
| 6,628,195 B1 | 9/2003 | Coudon |
| 6,636,197 B1 | 10/2003 | Goldenberg et al. |
| 6,636,202 B2 | 10/2003 | Ishmael, Jr. et al. |
| 6,639,581 B1 | 10/2003 | Moore |
| 6,639,582 B1 | 10/2003 | Shrader |
| 6,647,145 B1 | 11/2003 | Gay |
| 6,671,618 B1 | 12/2003 | Hoisko |
| 6,680,729 B1 | 1/2004 | Martin et al. |
| 6,690,955 B1 | 2/2004 | Komiyama |
| 6,697,043 B1 | 2/2004 | Shahoian |
| 6,710,518 B2 | 3/2004 | Morton et al. ................. 310/328 |
| 6,723,937 B2 | 4/2004 | Englemann et al. |
| 6,727,916 B1 | 4/2004 | Ballard |
| 6,792,294 B1 | 9/2004 | Kushita |
| 6,819,922 B1 * | 11/2004 | Janz ............................... 455/420 |
| 6,822,635 B2 | 11/2004 | Shahoian et al. |
| 6,834,373 B2 | 12/2004 | Dieberger |
| 6,850,150 B1 | 2/2005 | Ronkainen |
| 6,850,781 B2 | 2/2005 | Goto |
| 6,859,819 B1 | 2/2005 | Rosenberg et al. |
| 6,876,847 B2 | 4/2005 | Kudoh |
| 6,882,713 B2 | 4/2005 | Sakai et al. |
| 6,885,876 B2 | 4/2005 | Aaltonen et al. |
| 6,940,497 B2 * | 9/2005 | Vincent et al. ................. 345/204 |
| 6,944,482 B2 | 9/2005 | Engstrom et al. |
| 6,963,762 B2 | 11/2005 | Kaaresoja et al. |
| 6,963,839 B1 | 11/2005 | Ostermann et al. |
| 6,982,696 B1 | 1/2006 | Shahoian |
| 7,009,595 B2 | 3/2006 | Roberts et al. |
| 7,061,466 B1 | 6/2006 | Moore et al. |
| 7,096,045 B2 | 8/2006 | Yoshinaga |
| 7,103,389 B2 | 9/2006 | Shibata |
| 7,113,177 B2 | 9/2006 | Franzen |
| 7,127,271 B1 * | 10/2006 | Fujisaki ...................... 455/556.1 |
| 7,149,208 B2 * | 12/2006 | Mattaway et al. ............. 370/352 |
| 7,151,528 B2 | 12/2006 | Taylor et al. |
| 7,171,191 B2 | 1/2007 | Olson |
| 7,184,765 B1 | 2/2007 | Birnie et al. |

| | | |
|---|---|---|
| 7,215,329 B2 | 5/2007 | Yoshikawa et al. |
| 7,218,310 B2 | 5/2007 | Tierling |
| 7,225,000 B2 | 5/2007 | Katayanagi |
| 7,289,796 B2 | 10/2007 | Kudoh |
| 7,292,227 B2 | 11/2007 | Fukumoto et al. |
| 7,312,790 B2 | 12/2007 | Sato et al. |
| 7,328,020 B2 | 2/2008 | Masuda et al. |
| 7,336,260 B2 | 2/2008 | Martin et al. |
| 7,336,977 B2 | 2/2008 | Katayanagi |
| 7,369,115 B2 | 5/2008 | Cruz-Hernandez et al. |
| 7,373,120 B2 | 5/2008 | Messel et al. |
| 7,424,272 B2 | 9/2008 | Horiguchi |
| 7,450,110 B2 | 11/2008 | Shahoian et al. |
| 7,463,249 B2 | 12/2008 | Knowles et al. |
| 7,533,342 B1 * | 5/2009 | Vialle et al. .................... 715/717 |
| 7,548,232 B2 | 6/2009 | Shahoian et al. |
| 7,728,820 B2 | 6/2010 | Rosenberg et al. |
| 2001/0036832 A1 | 11/2001 | McKay .......................... 455/456 |
| 2001/0044328 A1 | 11/2001 | Tsukamoto |
| 2002/0012323 A1 * | 1/2002 | Petite et al. .................... 370/252 |
| 2002/0035854 A1 | 3/2002 | Herzbach et al. |
| 2002/0039914 A1 * | 4/2002 | Hama et al. .................... 455/566 |
| 2002/0044155 A1 | 4/2002 | Becker ........................... 345/684 |
| 2002/0107936 A1 | 8/2002 | Amon |
| 2002/0111737 A1 | 8/2002 | Hoisko |
| 2002/0130904 A1 | 9/2002 | Becker et al. ................. 345/753 |
| 2002/0193125 A1 | 12/2002 | Smith |
| 2002/0194246 A1 | 12/2002 | Moskowitz et al. .......... 709/102 |
| 2003/0002682 A1 | 1/2003 | Smith et al. |
| 2003/0006892 A1 | 1/2003 | Church |
| 2003/0016211 A1 | 1/2003 | Woolley |
| 2003/0022701 A1 | 1/2003 | Gupta |
| 2003/0038776 A1 | 2/2003 | Rosenberg et al. |
| 2003/0045266 A1 | 3/2003 | Staskal et al. |
| 2003/0048260 A1 | 3/2003 | Matusis |
| 2003/0058265 A1 | 3/2003 | Robinson et al. |
| 2003/0067440 A1 * | 4/2003 | Rank .............................. 345/156 |
| 2003/0071795 A1 | 4/2003 | Baldauf et al. |
| 2003/0076298 A1 | 4/2003 | Rosenberg |
| 2003/0078071 A1 * | 4/2003 | Uchiyama ...................... 455/557 |
| 2003/0095105 A1 | 5/2003 | Vaananen |
| 2003/0128191 A1 | 7/2003 | Strasser et al. |
| 2003/0128192 A1 | 7/2003 | van Os |
| 2003/0174121 A1 | 9/2003 | Poupyrev et al. ............. 345/156 |
| 2003/0184574 A1 | 10/2003 | Phillips et al. |
| 2003/0236729 A1 | 12/2003 | Epstein et al. |
| 2004/0059790 A1 | 3/2004 | Austin-Lane |
| 2004/0067780 A1 | 4/2004 | Eiden |
| 2004/0203656 A1 * | 10/2004 | Andrew et al. ............. 455/414.1 |
| 2004/0204049 A1 * | 10/2004 | Hsu et al. .................... 455/556.1 |
| 2005/0134561 A1 | 6/2005 | Tierling et al. |
| 2006/0248183 A1 | 11/2006 | Barton |
| 2007/0229478 A1 | 10/2007 | Rosenberg et al. |
| 2008/0068350 A1 | 3/2008 | Rosenberg et al. |

FOREIGN PATENT DOCUMENTS

| | | |
|---|---|---|
| EP | 0062664 | 10/1982 |
| EP | 0085518 | 8/1983 |
| EP | 0265011 | 4/1988 |
| EP | 0349086 | 1/1990 |
| EP | 0607580 | 7/1994 |
| EP | 0556999 | 5/1998 |
| EP | 0626634 | 11/1998 |
| EP | 0875819 | 11/1998 |
| EP | 1182851 | 2/2002 |
| JP | 63-164127 | 10/1988 |
| JP | 01-003664 | 7/1990 |
| JP | 02-109714 | 1/1992 |
| JP | 05-020226 | 3/1993 |
| JP | 04-007371 | 8/1993 |
| JP | 06-018341 | 1/1994 |
| JP | 06-139018 | 5/1994 |
| JP | 06-265991 | 9/1994 |
| JP | 05-193862 | 1/1995 |
| JP | 07-064723 | 3/1995 |
| JP | 07-113703 | 5/1995 |
| JP | 07-266263 | 10/1995 |
| JP | 2511577 | 7/1996 |
| JP | 10-105337 | 4/1998 |

| | | |
|---|---|---|
| JP | 11-299305 | 2/1999 |
| JP | 11-085400 | 3/1999 |
| JP | 11-338629 | 12/1999 |
| JP | 2001-350592 | 12/2001 |
| JP | 2002-259059 A | 9/2002 |
| WO | WO 92/00559 | 1/1992 |
| WO | WO 95/20788 A1 | 8/1995 |
| WO | WO 95/32459 | 11/1995 |
| WO | WO 96/28777 | 9/1996 |
| WO | WO 97/12357 | 4/1997 |
| WO | WO 97/18546 | 5/1997 |
| WO | WO 97/20305 | 6/1997 |
| WO | WO 97/21160 | 6/1997 |
| WO | WO 97/31333 | 8/1997 |
| WO | WO 98/08159 | 2/1998 |
| WO | WO 98/24183 | 6/1998 |
| WO | WO 98/58323 | 12/1998 |
| WO | WO 99/40504 | 8/1999 |
| WO | WO 00/03319 | 1/2000 |
| WO | WO 00/21071 | 4/2000 |
| WO | 00/41788 | 7/2000 |
| WO | 02/03172 | 1/2002 |
| WO | WO 02/12991 | 2/2002 |
| WO | WO 02/27645 | 4/2002 |
| WO | WO 02/31807 | 4/2002 |
| WO | 02/059869 | 8/2002 |
| WO | 02/078810 | 10/2002 |
| WO | 2004/052193 | 6/2004 |
| WO | 2004/053644 | 6/2004 |
| WO | 2004/053671 | 6/2004 |
| WO | 2004/053829 | 6/2004 |
| WO | 2004/053830 | 6/2004 |

OTHER PUBLICATIONS

Search Report, International Searching Authority, PCT/US03/38862, Apr. 12, 2004.
Search Report, International Searching Authority, PCT/US03/38899, Apr. 19, 2004.
Search Report, International Searching Authority, PCT/US03/38961, Apr. 5, 2004.
Search Report, International Searching Authority, PCT/US01/41099, Jan. 2, 2002.
Search Report, International Searching Authority, PCT/US03/38900, Apr. 14, 2004.
Search Report, International Searching Authority, PCT/US03/38868, Sep. 27, 2004.
Erikson, Carl, "Polygonal Simplification: An Overview," Dept. of Computer Science, TR96-016, 1996, pp. 1-32.
Hardman, Lynda et al., "Do You Have the Time? Composition and Linking in Time-based Hypermedia," Proceedings of the 10th ACM Conference on Hypertext and Hypermedia, Feb. 1999, pp. 189-196.
MacLean, Karon E. et al., "An Architecture for Haptic Control of Media," in: The Proceedings of the ASMA Dynamic Syatems and Control Division: 1999 International Mechanical Engineering Congress and Exposition, Eighth Annual Symposium on Haptic Interfaces for Virtual Environment and Teleoperator Systems, Nov. 14-19, 1999, pp. 1-10.
Snibbe, Scott S., "Haptic Techniques for Media Control," in Proceeding of the 14th Annual ACM Symposium on User Interface Software and Technology, 2001, pp. 1-10.
International Search Report and Written Opinion, Application No. PCT/US06/35645, dated Jun. 23, 2008.
Adachi et al., "Sensory Evaluation of Virtual Haptic Push-Buttons," 1994, Suzuki Motor Corp., pp. 1-7.
Adelstein, "A Virtual Environment System for the Study of Human Arm Tremor," Ph.D. Dissertation, Dept. of Mechanical Engineering, MIT, Jun. 1989.
Adelstein, "Design and Implementation of a Force Reflecting Manipulandum for Manual Control research," DSC-vol. 42, Advances in Robotics, Edited by H. Kazerooni, pp. 1-12, 1992.
Adelstein, et al., "A High Performance Two-Degree-of-Freedom Kinesthetic Interface," MIT, 1992, pp. 108-112.
Akamatsu et al., "Multimodal Mouse: A Mouse-Type Device with Tactile and Force Display," 1994, Presence vol. 3, pp. 73-80.

Atkinson et al., "Computing with Feeling,", Comput. & Graphics, vol. 2, 1977, pp. 97-103.
Aukstakalnis et al., "Silicon Mirage: The Art and Science of Virtual Reality," ISBN 0-938151-82-7, pp. 129- 180, 1992.
Baigrie, "Electric Control Loading—a Low Cost, High Performance Alternative," Proceedings, pp. 247-254, Nov. 6-8, 1990.
Batter et al., "Grope-1: A computer Display to the sense of Feel," Proc IFIP Congress, 1971, pp. 759-763.
Bejczy, "Generalization of Bilateral Force-Reflecting Control of Manipulators," Proceedings of Fourth Cism—IFToMM, Sep. 8-12, 1981.
Bejczy, "Sensors, Controls, and Man-Machine Interface for Advanced Teleoperation," Science, vol. 208, No. 4450, pp. 1327-1335, 1980.
Bejczy et al., "A Laboratory Breadboard System for Dual-Arm Teleoperation," SOAR '89 Workshop, JSC, Houston, TX, Jul. 25-27, 1989.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, et al., "Universal Computer Control System (UCCS) for Space Telerobots," CH2413-3/87/0000/0318501.00 1987 IEEE, 1987.
Bejezy et al., "The Phantom Robot: Predictive Displays for Teleoperation with Time Delay," IEEE CH2876, Jan. 1990, pp. 546-550.
Bliss, James C., "Optical-to-Tactile Image Conversion for the Blind," IEEE Transactions on Man-Machine Systems, vol. MMS-11, No. 1, 1970, pp. 58-65.
Bolanowski, S.J. et al., "Four Channels Mediate the Mechanical Aspects of Touch," J. Acoust. Soc. Am. 84 vol. 84 (5), Nov. 1988, pp. 1680-1694.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Brooks, Jr. et al., "Project GROPE, Haptic Displays for Scientific Visualization,", Computer Graphics, vol. 24, #4, 1990, pp. 177-184.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Buttolo et al."Pen-based force Display for Precision Manipulation in Virtual Environments," IEEE 0-8186-7084-3, 1995, pp. 217-224.
Calder, "Design of a Force-Feedback Touch-Introducing Actuator for Teleoperator Robot Control," Bachelor of Science Thesis, MIT, Jun. 23, 1983.
Caldwell et al., "Enhanced Tactile Feedback (Tele-Taction) Using a Multi-Functional Sensory System," 10504729/93, pp. 955-960, 1993.
Chang "Audio-Haptic Feedback in Mobile Phones", Proceedings of AMC CHI 2005 Conference on Human Factors in Computing Systems, Apr. 2-7, 2005, Portland, Oregon, pp. 1264-1267, 2005.
Colgate et al., "Implementation of Stiff Virtual Walls in Force-Reflecting Interfaces," Northwestern University, IL, 1993., pp. 1-8.
Dennerlein et al., "Vibrotactile Feedback for Industrial Telemanipulators," 1997, Sixth Annual Symp. on Haptic Interfaces for Virtual Env. and Teleoperator Systems, ASME IMECE, Dallas, pp. 1-7.
Dennerlein, Jack et al., "Commercialization of Vibrotactile Feedback for Telemanipulation and Virtual Environments," 1997, Phase I Final Report for ONR Contract N00014-96-C-0325 (not published or publicly available).
Durlach, Nathaniel I. et al, "Virtual REALITY: Scientific and Technological Challenges", National Academy Press, Washington, DC 1995 pp. 160-205.
Eberhardt, Silvio P. et al., "Inducing Dynamic Haptic Perception by the Hand: System Description and Some Results," Proceedings of ASME Dynamic Systems and Control, vol. DSC-55-1, No. 1, 1994, pp. 345-351.
Eberhardt, Silvio P. et al., "OMAR—A Haptic Display for Speech Perception by Deaf and Deaf-Blind Individuals," IEEE 1993, pp. 195-201.

Ellis et al., Design & Evaluation of a High-Performance Prototype Planar Haptic Interface, Dec. 1993, Advances in Robotics, 55-64.

Fischer, et al., "Specification and Design of Input Devices for Teleoperation," IEEE CH2876, Jan. 1990, pp. 540-545.

Fokumoto, "Active Click: Tactile Feedback for Touch Panels," ACM CHI2001 Extended Abstracts, pp. 121-122, Apr. 2001.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Fukuhara et al, Voice Café: Conversation Support System in a Gourp, 2001, IOS Press, pp. 334 and 335.

Gobel et al., "Tactile Feedback Applied to Computer Mice," International Journal of Human-Computer Interaction, vol. 7, No. 1, pp. 1-24, 1995.

Goldstein, Moise H. et al., "Tactile Aids for the Profoundly Deaf Child," 77 J. Acoust. Soc. Am 77 (1), Jan. 1985, pp. 258-265.

Gotow et al., "Controlled Impedance Test Apparatus for Studying Human Interpretation of Kinesthetic Feedback," WA11-11:00, pp. 332-337.

Gotow et al., "Perception of Mechanical Properties at the Man-Machine Interface," IEEE CH2503-1, 1987, pp. 688-690.

Hannaford et al., "Force-Feedback Cursor Control," NASA Tech Briefs, vol. 13, No. 11, 1989, pp. 1-7.

Hannaford et al., "Performance Evaluation of a 6-Axis Generalized Force-Reflecting Teleoperator," IEEE Transactions on Systems, Man, and Cybernetics, vol. 21, No. 3, 1991, pp. 621-623, 631-633.

Hasser, C., "Tactile Feedback for a Force-Reflecting Haptic Display," School of Eng., Univ. of Dayton, Dayton, OH, 1995, pp. 1-98.

Hasser, C. et al., "Tactile Feedback with Adaptive Controller for a Force-Reflecting Haptic Display," Parts 1 and 2, IEEE 0-7803-3131-1, 1996, pp. 526-533.

Hirota et al., "Development of Surface Display," IEEE 0-7803-1363-1, 1993, pp. 256-262.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Howe et al., "Task Performance w/ a dextrous Teleoperated Hand System," Proc. of SPIE, vol. 1833, 1992, pp. 1-9.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Iwata, Hiroo, "Artificial Reality with Force-feedback: Development of Desktop Virtual Space with Compact Master Manipulator," Computer Graphics, vol. 24, No. 4, Aug. 1990, pp. 165-170.

Jackson, K. M., "Linerity of Radio-Frequency Transducers", Medical and Biological Engineering and Computer, Jul. 1977, pp. 446-449.

Jacobsen et al., "High Performance, Dextrous Telerobotic Manipulator With Force Reflection," InterventiorVROV '91 Conference & Exposition, Hollywood, Florida, May 21-23, 1991.

Johnson, David A., "Shape-Memory Alloy Tactile Feedback Actuator," Armstrong Aerospace Medical Research Laboratory, AAMRL-TR-90-039, Aug. 1990. (Tini Allow Company, Inc., Aug. 1990, 2 pages, pp. i-33).

Jones et al., "A perceptual analysis of stiffness," ISSN 0014-4819 Springer International (Springer-Verlag); Experimental Brain Research, vol. 79, No. 1, pp. 150-156, 1990.

Kaczmarek, K. A. et al. "Tactile Displays," in: Virtual Environments and Advanced Interface Design, New York: Oxford University Press, 1995, pp. 349-414.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kelley et al., "MagicMouse: Tactile and Kinesthetic Feedback in the Human—Computer Interface using an Electromagnetically Actuated Input/Output Device," Oct. 19, 1993 University of British Columbia pp. 1-27.

Kelley et al., "On the Development of a Force-Feedback Mouse and its Integration into a graphical user Interface," Nov. 1994, Engineering Congress and Exhibition, pp. 1-8.

Kilpatrick et al., "The Use of Kinesthetic Supplement in an Interactive Graphics System," University of North Carolina, 1976, pp. 1-172.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," PRESENCE, 4(4):387-402, 1995.

Kotoku, "A Predictive Display with Force Feedback and its Application to Remote Manipulation System with Transmission Time Delay," Proc. of IEEE/RSJ Int'l Conf. on Intelligent Robots and Systems, Jul. 1992.

Kotoku, et al., "Environment Modeling for the Interactive Display (EMID) Used in Telerobotic Systems," IEEE/RSJ Int'l Workshop on Intelligent Robots and Systems, Nov. 1991, pp. 999-1004.

Lake, "Cyberman from Logitech," GameBytes, 1994.

"Cyberman Technical Specification," Logitech Cyberman SWIFT Supplement, Apr. 5, 1994. cited by other.

Marcus, "Touch Feedback in Surgery," Proceedings of Virtual Reality and Medicine the Cutting Edge, Sep. 8-11, 1994.

McAffee et al, Teleoperator Subsystem/Telerobot Demonstrator: Force Reflecting Hand Controller Equipment Manual, JPL D-5172, pp. 1-50, A1-A36, B1-B5, C1-C36, Jan. 1988.

Millman et al., "Design of a 4 Degree of Freedom Force-Reflecting Manipulandum with a Specified Force/Torque Workspace," IEEE CH2969-4, 1991, pp. 1488-1493.

Minsky, "Computational Haptics: The Sandpaper System for Synthesizing Texture for a Force-Feedback Display," Ph.D. Dissertation, MIT, Jun. 1995.

Minsky et al., "Feeling & Seeing:Issues in Force Display," ACM089791-351-5, 1990, pp. 235-242, 270.

Munch et al., "Intelligent Control for Haptic Displays," Eurographics '96, vol. 15, No. 3, 1996, pp. 217-226.

Noll, "Man-Machine Tactile," SID Journal, Jul./Aug. 1972 Issue.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, Vol. 41, No. 3, Aug. 1995.

Ouh-Young et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young et al., "Creating an Illusion of Feel: Control Issues in Force Display," Univ. of N. Carolina, 1989, pp. 1-14.

Ouh-young, et al., Using a Manipulator for Force Display in Molecular Docking, IEEE CH2555, 1988, pp. 1824-1829.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Payette et al., "Evaluation of a Force Feedback (Haptic) Computer Printing Device in Zero Gravity," Oct. 17, 1996, ASME Dynamics Systems, vol. 58 pp. 547-553.

Peine, W.J., "Tactile Shape Displays for Small Scale Shape Feedback," http://www.hrl.harvard.eduk-peine/display. html, 1998, pp. 1-2.

Pimentel et al., Virtual Reality: through the new looking glass, 2nd Edition; McGraw-Hill, ISBN 0-07-050167-X, pp. 41-202, 1994.

Rabinowitz, W. M. et al., "Multidimensional Tactile Displays: Identification of Vibratory Intensity, Frequency, and Contactor Area," J. Acoust. Soc. Am. 82 (4), Oct. 1987, pp. 1243-1252.

Ramstein, Christophe, "Combining Haptic and Braille Technologies: Design Issues and Pilot Study," Assets '96, 2nd Annual ACM Conference on Assistive Technologies, ACM SIGRAPH, Apr. 1996, pp. 37-44.

Ramstein et al., "The Pantograph: A Large Workspace Haptic Device for a Multimodal Human—Computer Interaction," Computer—Human Interaction, CHI 1994, pp. 1-3.

Rosenberg, "Virtual Fixtures: Perceptual Overlays Enhance Operator Performance in Telepresence Tasks," Ph.D. Dissertation, Stanford University, Jun. 1994.

Rosenberg, L., "Virtual fixtures as tools to enhance operator performance in telepresence environments," SPIE Manipulator Technology, 1993, pp. 1-12.

Rosenberg et al., "A Force Feedback Programming Primer," Immersion Corp., 1997, pp. 1-176.

Rosenberg et al., "Commercially Viable force feedback Controller for Individuals with Neuromotor Disabilities," Armstrong Laboratory, AL/CF-TR-1997-0016, 1996, pp. 1-33.

Rosenberg et al., "Perceptual Decomposition of Virtual Haptic Surfaces," Proc. IEEE Symposium on Research Frontiers in Virtual Reality, 1993, pp. 1-8.

Rosenberg et al., "The use of force feedback to enhance graphical user interfaces," Stereoscopic Displays & Virtual Reality Systems, 1996, pp. 243-248.

Rosenberg, "Perceptual Design of a Virtual Rigid Surface Contact," Armstrong Laboratory AL/CF-TR-1995-0029, 1993, pp. 1-45.

Rosenberg, "Virtual Haptic Overlays Enhance Performance in Telepresence Tasks," Dept. of Mech. Eng., Stanford Univ., 1994.

Rosenberg, et al., "The Use of Force Feedback to Enhance Graphical User Interfaces," Proc. SPIE 2653, 1996, pp. 243-248.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Schmult et al., "Application Areas for a Force-Feedback Joystick," 1993, Advances in Robotics, vol. 49, pp. 47-54.

"Component Maintenance Manual with Illustrated Parts List, Coaxial Shaker Part No. C-25502", Safe Flight Instrument Corporation, Revised Jan. 28, 2002 (3 pages).

"Technical Manual Overhaul Instructions With Parts Breakdown, Coaxial Control Shaker Part No. C-25502", Safe Flight Instrument Corporation, revised Jul. 15, 1980 (23 pages).

Safe Flight Instruments Corporation, Coaxial Control Shaker, Part No. C-25502, Jul. 1, 1967.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Force Feedback Touch Panel, Represented by CSC Division, Sales Department, SIXIK Corporation, Tokyo, Japan, www.smk.co.jp. cited by other.

SMK Corporation, "Force Feedback Type Optical Touch Panel Developed," SMK Corporation Website, Oct. 30, 2002.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Su et al., "The Virtual Panel Architectures: A 3D Gesture Framework," University of Maryland, pp. 387-393.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Tan et al., "Manual Resolution of Compliance When Work and Force Cues are Minimized," DSC-vol. 49, Advances in Robotics, Mechatronics, and Haptic Interfaces, ASME 1993, pp. 99-104.

Terry et al., "Tactile Feedback in a Computer Mouse," Proceedings of Fourteenth Annual Northeast Broengineenng Conference, University of New Hampshire, Mar. 10-11, 1988.

Wiker, "Teletouch Display Development: Phase 1 Report," Technical Report 1230, Naval Ocean Systems Center, San Diego, Apr. 17, 1989. cited by other.

Wiker, Steven F., "Teletouch Display Development: Phase 1 Report," Naval Ocean Systems Center, Technical Report 1230, Jul. 1988, 66 pages.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.

Winey III, "Computer Stimulated Visual & Tactile Feedback as an Aid to Manipulator & Vehicle Control," MIT, 1981, pp. 1-79.

Yamakita et al., "Tele-Virtual Reality of Dynamic Mechanical Model," Proc. of IEEE/RSJ Int'l Conf. on Intelligent Robots and Systems, Jul. 1992, pp. 1103-1110.

Yokokoji, et al., "What You Can See is What You Can Feel—Development of a Visual/Haptic Interface to Virtual Environment," Proc. VRAIS 1996.

Yokokoji et al., "What you can see is what you can feel," IEEE 0-8186-7295-1, 1996, pp. 46-54.

IPRP PCT/US2005/036861 mailed Feb. 23, 2006.
ISR/WO-PCT/US06/45644 dated Sep. 13, 2007.
ISR/WO-PCT/US2005/036861 mailed Feb. 23, 2006.
Definition of "avatar", 2001, Hargrave's Communications Dictionary.

* cited by examiner

METHODS AND SYSTEMS FOR PROVIDING HAPTIC MESSAGING TO HANDHELD COMMUNICATION DEVICES

CROSS-REFERENCE TO RELATED APPLICATIONS

This application is a continuation-in-part of U.S. patent application Ser. No. 10/538,160 in the names of inventors Danny Grant, Jeffrey Eid, and Shoichi Endo, filed on Mar. 20, 2007, now abandoned which was based on PCT Patent Application No. US03/038899, filed Dec. 8, 2003, wherein PCT Patent Application No. US03/038899 claims the benefit of U.S. Provisional Patent Application Ser. No. 60/431,662, filed on Dec. 8, 2002.

FIELD OF THE INVENTION

This invention relates generally to haptic-feedback systems. More specifically, embodiments of the present invention relate to using customized haptic effects in a variety of applications to convey information to users of handheld communication devices.

BACKGROUND

As handheld communication devices become part of everyday life, device manufactures and service providers strive to enhance the versatility and performance of such devices.

Handheld communication devices in the art (e.g., mobile phones, pagers, personal digital assistants (PDAs), and the like) typically use auditory and visual cues to alert a user when incoming messages, such as voice calls and emails, are received. Such auditory and visual alerts, however, have the disadvantages of being distracting in some situations (e.g., during driving), or annoying in others (e.g., during a meeting or a concert). Likewise, they are insufficient in other situations such as a noisy environment (e.g., at a pub or in a crowd) or when a call is dropped and the user continues talking without realizing that nobody is still listening.

Although vibratory alerts are made available in some communication devices such as cellular phones, such vibratory effects cannot in accordance with the known prior art be customized or personalized according to applications, and thus are capable of conveying little information to the user. A need, therefore, exists in the art for a new sensory modality that delivers information to users of handheld communication devices in a personalized fashion.

Such sensory modality would help cut through communication clutter by prioritizing, categorizing, or highlighting messages and content as they are received. It would provide mobile phone users with better control over their handset and communications through greater flexibility, accuracy, and speed.

Moreover, engaging the sense of touch would enhance the reality of user experience. Touch unifies the spatial senses; those you use to navigate your way through the world—sight, sound, and touch. Touch produces reflex-rate response in milliseconds and supplies a completeness that sight and sound together can't replace. In short, touch makes an experience truly personal.

SUMMARY

Embodiments of the invention relate to methods and systems for providing customized "haptic messaging" to users of handheld communication devices in a variety of applications and contexts.

In one embodiment, a method for providing haptic messaging to a handheld communication device includes: associating an input signal with an event; and outputting a control signal to an actuator coupled to the handheld communication device, the control signal configured to cause the actuator to output a haptic effect associated with the event.

In another embodiment, a method for providing haptic messaging to a handheld communication device includes: receiving an input signal associated with a status event; and outputting a control signal to an actuator coupled to the handheld communication device at a prescribed time after receiving the input signal, the control signal configured to cause the actuator to output a haptic effect associated with the status event.

In yet another embodiment, a method for mapping between an event of interest and a corresponding haptic effect includes: providing a plurality of haptic effects to a user; allowing a user to associate haptic effects with one or more events of interest; and compiling the mappings made between various events of interest and corresponding haptic effects into a haptic lookup table, storable in memory.

Further details and advantages of embodiments of the invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments described in the following description are provided by way of example to illustrate some general principles of the invention, and should not be construed as limiting the scope of the invention in any manner. Those of ordinary skill in the art having the benefit of this disclosure will now also recognize that various changes and modifications can be made herein, without departing from the principles and scope of the invention.

Figure 1:
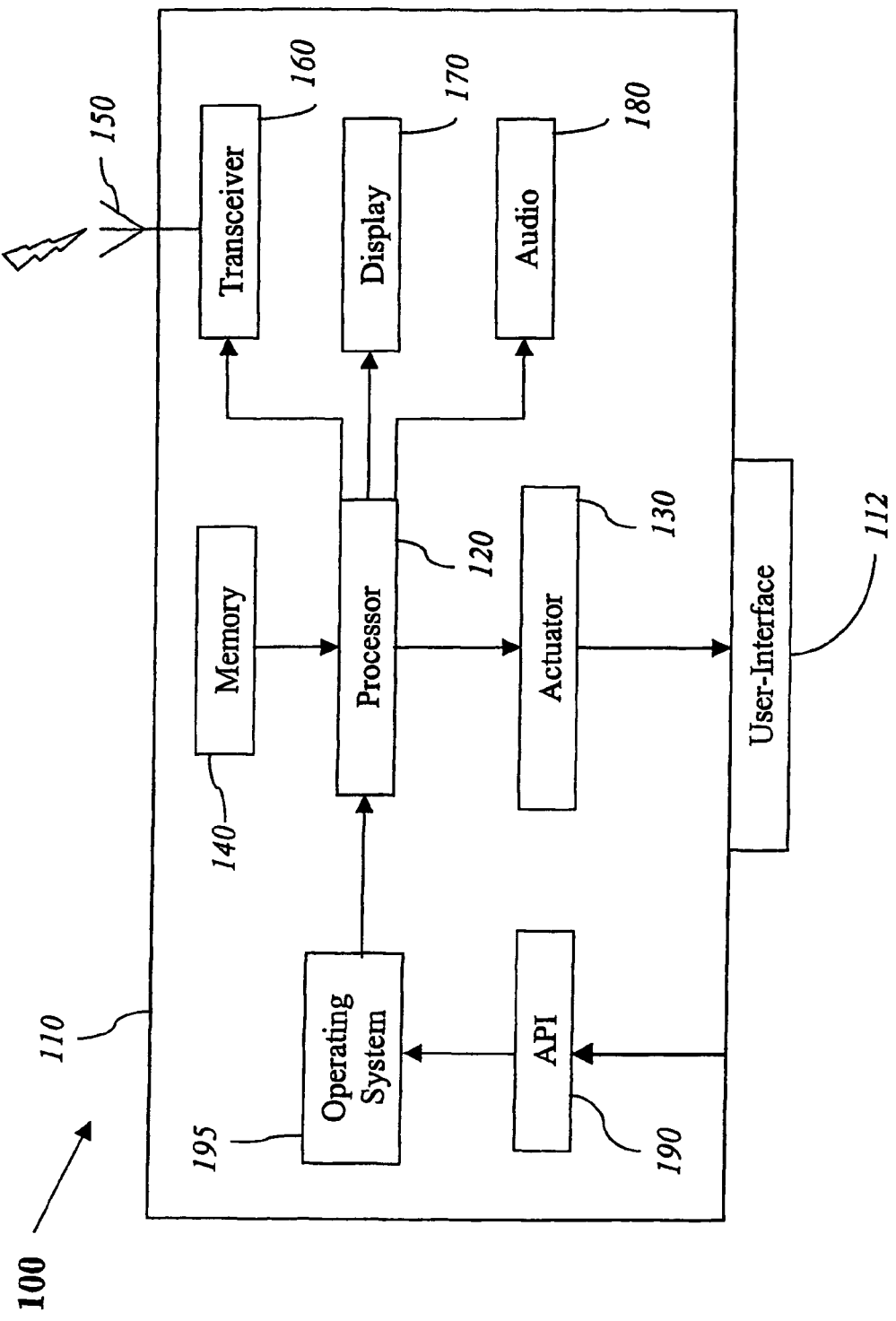
FIG. 1 is a block diagram of a haptic handheld communication device according to an embodiment of the present invention.

FIG. 1 depicts a block diagram of a handheld communication system incorporating device 100 in accordance with one embodiment of the present invention. It will be appreciated that various elements are shown in schematic form for illustrative purposes and are not drawn to scale. It will also be appreciated that many alternative ways of practicing the present invention exist. Accordingly, various changes and modifications may be made herein, without departing from the principles and scope of the invention.

Device 100 includes a device body including a housing 110 and a user-interface 112; a processor 120; at least one actuator 130 in communication with processor 120; and a memory 140 in communication with processor 120. Device 100 also includes an antenna 150 and a transceiver 160, in communication with processor 120. Device 100 additionally includes a display module 170 and an audio module 180, in communication with processor 120. Display module 170 may include, for example, a liquid crystal device. Audio means 180 may include, for example, a speaker, a microphone, and the like.

For purpose of illustration in the embodiment of FIG. 1, processor 120, actuator 130, and memory 140 are shown to be enclosed within and coupled to the device body. Such an illustration, however, should not be construed as limiting the scope of the invention in any manner. In alternative embodiments, actuator 130 may, for example, be coupled to the outside of housing 110, or embedded in housing 110 via a suitable mechanism. Further, user-interface 112 may include one or more user-interface members. As used herein, a user-interface member includes, without limitation, a key pad having one or more keys, one or more buttons, a touch screen or touch pad, a scroll wheel, a direction pad, a trackball, a knob, a miniature joystick, or other user-interface means known in the art.

Device 100 further includes an API (Application Program Interface) 190, working in conjunction with an operating system 195. A device driver (not shown) may optionally provide an interface between operating system 195 and processor 120.

Memory 140 of device 100 stores a program code that includes instructions to cause processor 120 to perform various tasks. The following description provides some examples.

Figure 2:
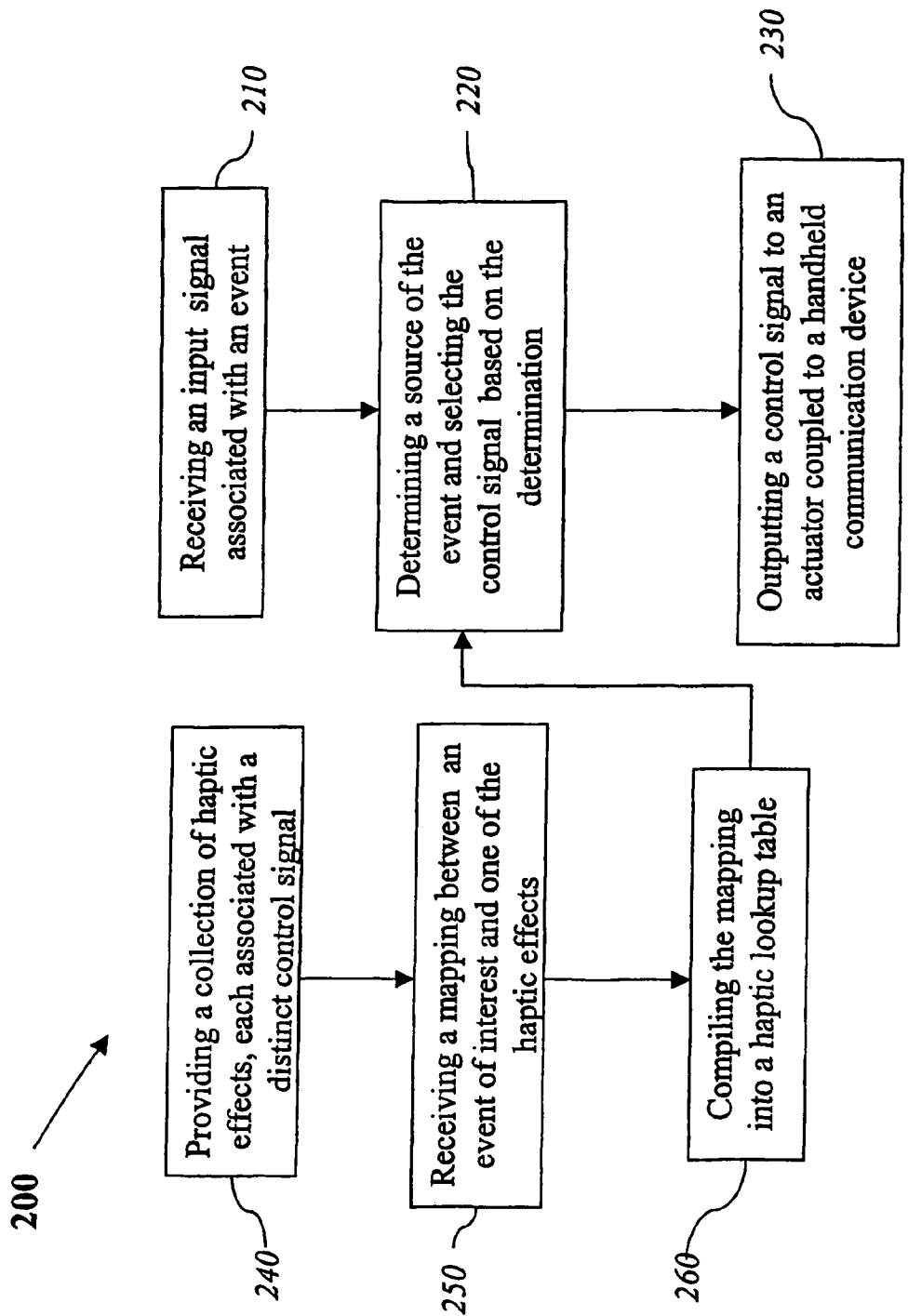
FIG. 2 is a flowchart depicting a method for using customized haptic effects to convey information to users of handheld communication devices, according to an embodiment of the present invention.

FIG. 2 shows a flowchart 200 depicting a method of using customized haptic effects to convey information to users of handheld communication devices, according to an embodiment of the invention. At step 210, an input signal associated with an event is received. At step 220, a source of the event is determined and a control signal is selected based on the determination. At step 230, a control signal is output to an actuator coupled to a handheld communication device (see FIG. 1 for an embodiment of such device). The control signal is configured to cause the actuator to output a haptic effect associated with the event.

Furthermore at step 240, a collection of haptic effects is provided, each haptic effect being associated with a control signal. For example, memory 140 of FIG. 1 can store a program code that includes instructions to generate the control signals (e.g., each characterized by a distinct waveform) for rendering the corresponding haptic effects. Haptic effects (along with associated control signals) may also be downloaded or transmitted from a remote source, such as a service provider, a network resource, a Web server, a remote handheld communication device or computer. Such downloaded or transmitted haptic effects can be further edited or modified. It is envisioned that third-party applications for handheld communication devices may enable users to purchase and download additional haptic effects as well as to edit and modify them. The haptic effects may also be provided in the form of a bundled package that also includes visual effects and audio effects which may or may not be configured to be synchronized with the haptic effects.

At step 250, a mapping between an event of interest and one of the stored haptic effects is received. By way of example, memory 140 of FIG. 1 may also store a program code that enables a user to map an event of interest to one of the haptic effects as provided, e.g., via user-interface 112 through API 190, where the event may be identified by its source. At step 260, the one-to-one mappings made between various events of interest and the corresponding haptic effects are compiled into a haptic lookup table, which can, for example, be stored in memory 140 of FIG. 1.

In the embodiment of FIG. 2, the term "selecting" includes, without limitation, looking up a predetermined mapping between the event of interest and a corresponding haptic effect based on the source determination, and selecting or generating a control signal that is configured to render the desired haptic effect associated with the event (e.g., upon being applied to an actuator). Selection can be made based upon the aforementioned haptic lookup table, for example. In one embodiment, the input signal may include a communication signal associated with a call event, such as a voice call, an e-mail, or a message in text or multimedia form, which may be received via antenna 150 and transceiver 160 of FIG. 1, for example. The "source" of a call event may be related to a characteristic that distinctly identifies or characterizes the call event, such as the caller's phone number, the sender's e-mail address, a graphical feature or an icon associated with the incoming message, etc.

In accordance with another embodiment of the present invention, the input signal may be associated with a service carrier event specific to a user's wireless service carrier or wireless service plan. Notifications of service carrier events are intended to help a user manage phone calls. Service carrier events include an entering of a service zone, a weak carrier signal, a passage of an increment of time allotted in accordance with a mobile service plan, a roaming alert, a powering on of a handheld communication device and a powering off of a handheld communication device.

Certain service carrier events may depend upon where a user is in relation to the geographical coverage of his service carrier's network. In accordance with one example of this embodiment, a traveling user may feel a particular haptic effect when he enters the service zone of his service provider, when he receives a signal of a certain strength or when he leaves the service zone of his service provider. Such a notification informs a user of when he can make or receive calls, emails, SMS messages, etc. When outside the service carrier network, a user may be roaming, or using a visited network. Usage of a visited network may depend upon the roaming agreement between his service carrier provider and the visited network. With many service plans, roaming phone calls incur additional charges, and therefore a user may wish to receive haptic effects to notify him of such roaming. In accordance with another example of this embodiment, a user may feel a particular haptic effect when he has used up a certain increment of time in accordance with his service plan. Such a notification helps the user keep track of his cell phone usage and the service charges he is incurring.

In accordance with yet another example of this embodiment, a user may feel a particular haptic effect specific to the user's service carrier when the user is powering on the handheld communication device or powering off the handheld communication device.

The "source" of a service carrier event may be related to a user's service carrier or a graphical feature, icon or logo associated with the service carrier.

In accordance with yet another embodiment of the present invention, the input signal may be associated with a connection event such as a sending of an outgoing e-mail, a sending of an outgoing SMS message, a dropped call, a connected call, a passage of an increment of time when connected to a call, a push-to-talk ready alert, a push-to-talk receiving alert, and a push-to-talk when the line is busy alert. A connection event depends upon a user's connection status to a service network.

Push-To-Talk (PTT) is a two-way communication service that works like a "walkie talkie." A normal cell phone call is full-duplex, meaning both parties can hear each other at the same time. PTT is half-duplex, meaning communication can only travel in one direction at any given moment. To control which person can speak and be heard, PTT requires the person speaking to press a button while talking and then release it when they are done. The listener then presses their button to respond. This way the system knows which direction the signal should be traveling in.

A push-to-talk ready alert notifies the user when the system is ready for him to speak. A push-to-talk receiving alert notifies the user of a received push-to-talk call. A push-to-talk busy alert notifies a user making a push-to-talk call that the recipient's line is busy.

The source of a connection event may be related to a characteristic that distinctly identifies or characterizes the connection event, such as the other party's phone number, or the recipient's e-mail address.

In accordance with yet another embodiment of the present invention, the input signal may be associated with a user interface navigation event, for example scrolling, reaching the bottom of a list, wrapping around to the first item in a list, selecting an item on a list, selecting an item designated as a favorite, or use of a dedicated key.

Figure 10:
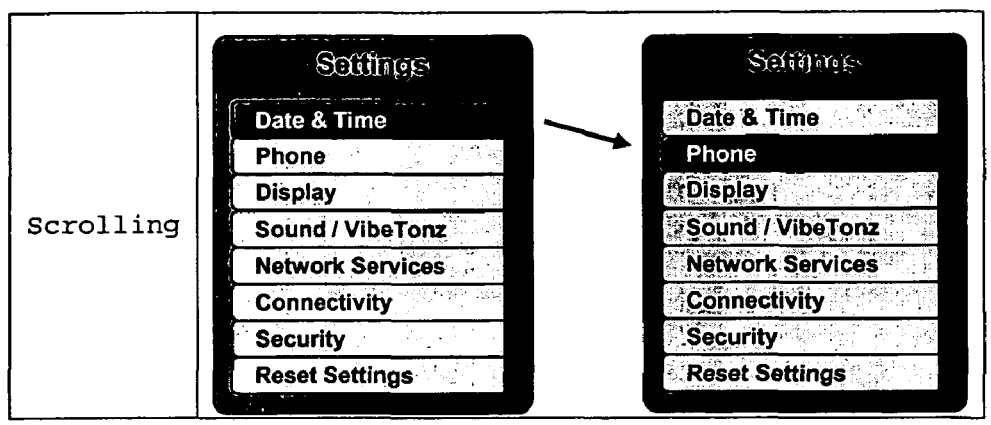
FIG. 10A is a diagram illustrating the user interface navigation event of scrolling in accordance with one embodiment of the present invention.
FIG. 10B is a diagram illustrating the user interface navigation event of reaching the end of a list in accordance with one embodiment of the present invention.
FIG. 10C is a diagram illustrating the user interface navigation event of wrapping around to the beginning of the list in accordance with one embodiment of the present invention.
FIG. 10D is a diagram illustrating the user interface navigation event of selecting a menu item from a list in accordance with one embodiment of the present invention.
FIG. 10E is a diagram illustrating the user interface navigation event of selecting an icon in accordance with one embodiment of the present invention.
FIG. 10F is a diagram illustrating the user interface navigation event of selecting a favorite menu item in accordance with one embodiment of the present invention.
FIG. 10G is a diagram illustrating the use of dedicated keys such as Send and End.

As an example of this embodiment, in FIG. 10A, the User presses the down key to navigate to the next item in a list menu. The user feels a gentle single-bump effect indicating simple movement across menu items. The user navigates to the bottom of the list and presses the down key. Since this is the last item, the visual highlight does not change.

Figure 10B:
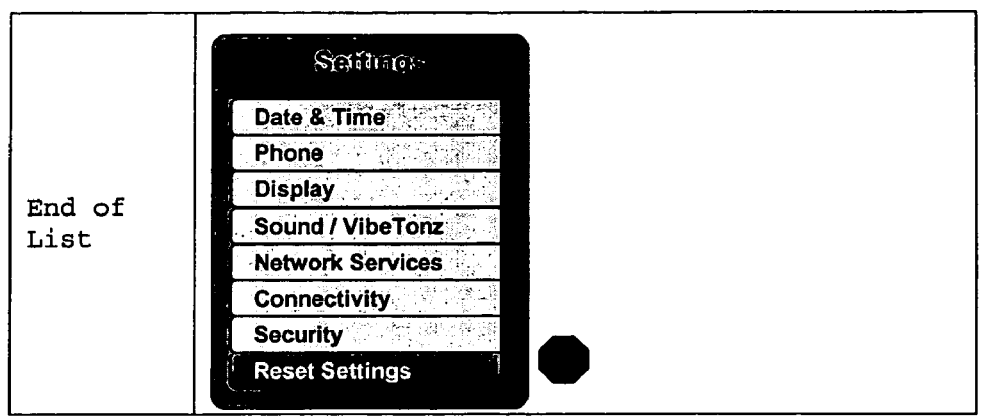

In FIG. 10B, the user feels a double-bump effect, notifying them that there are no more items in the list. The same effect should be felt at the top of the list. Table 2: Example of Typical User Interface Navigation Events and Associated Haptic Events.

Figure 10C:
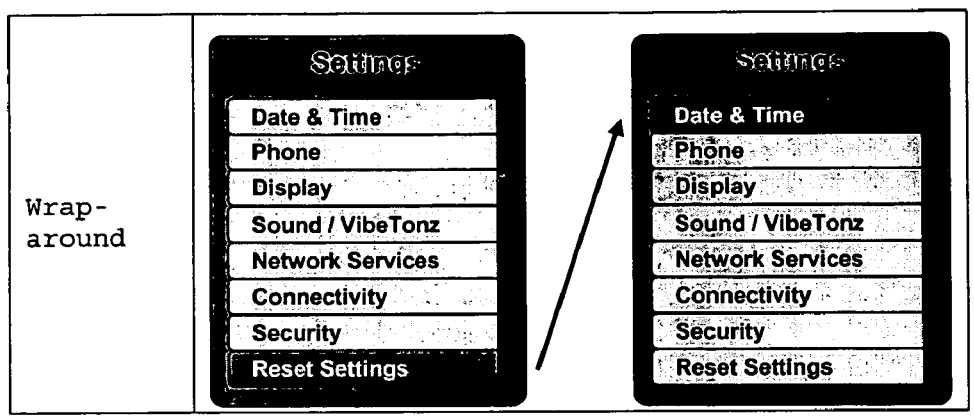

In FIG. 10C, The last item in a list is highlighted and the user presses the down key to wrap-around to the first item in the list. The user feels a strong single-bump effect. The same effect should be felt when wrapping around in the other direction (from the first to the last item).

Figure 10D:
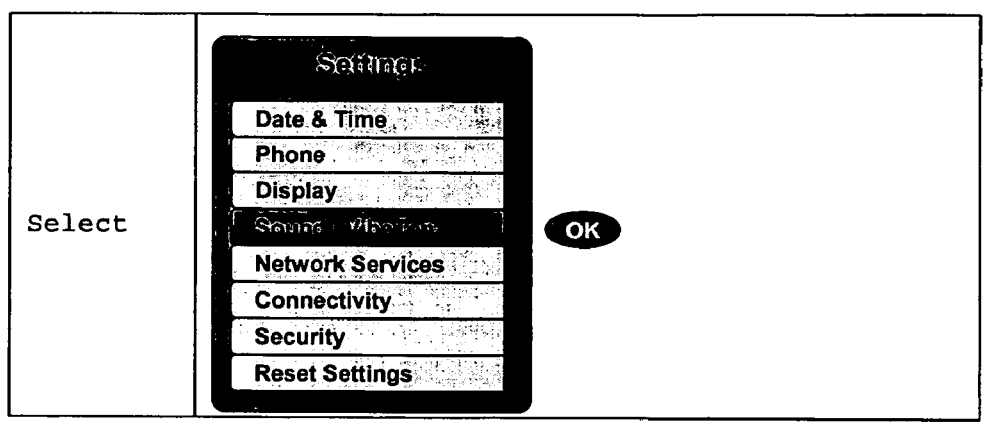

In FIG. 10D, the user presses the OK button to select a highlighted item from a list. The user feels a quick pulse to indicate the item was successfully selected.

Figure 10E:
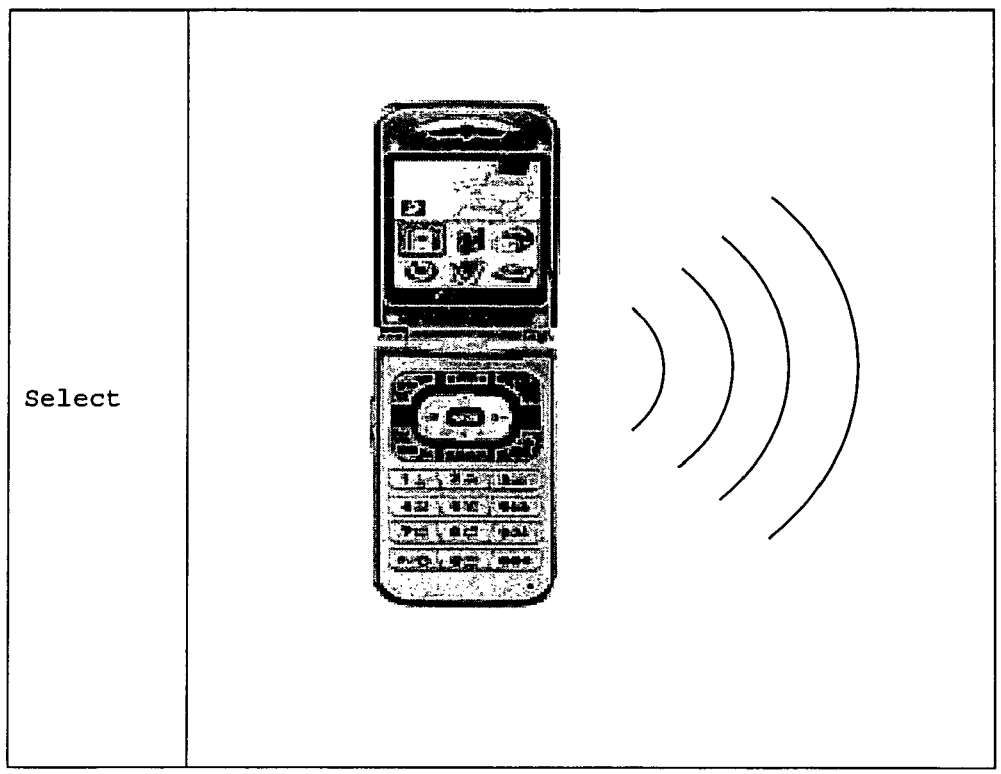

In FIG. 10E, the user presses the OK button to select a highlighted icon. The user feels a quick pulse to indicate the icon was successfully selected.

Figure 10F:
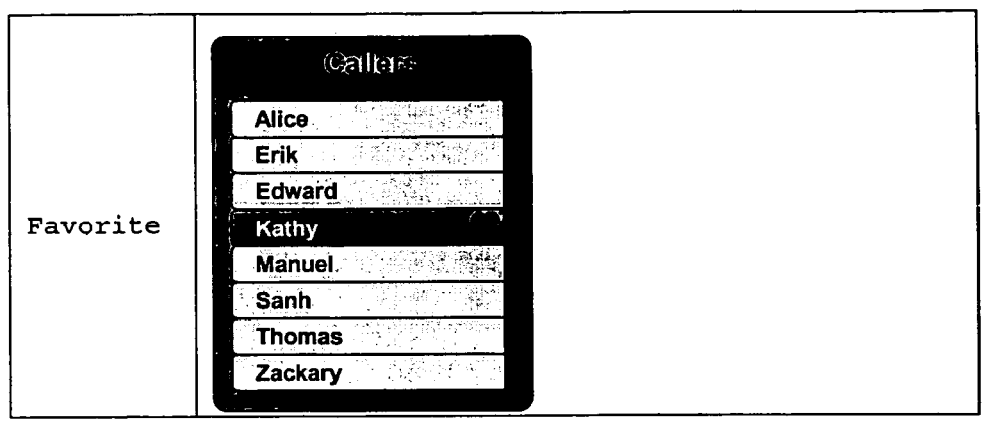

In FIG. 10F, certain items in a list may be accented by playing a unique haptic effect instead of the single-bump when scrolling to them. In this example, Kathy is the favorite. Since a unique haptic effect will be felt when highlighting Kathy, the user is able to scroll and select this favorite without looking at the display.

Figure 10G:
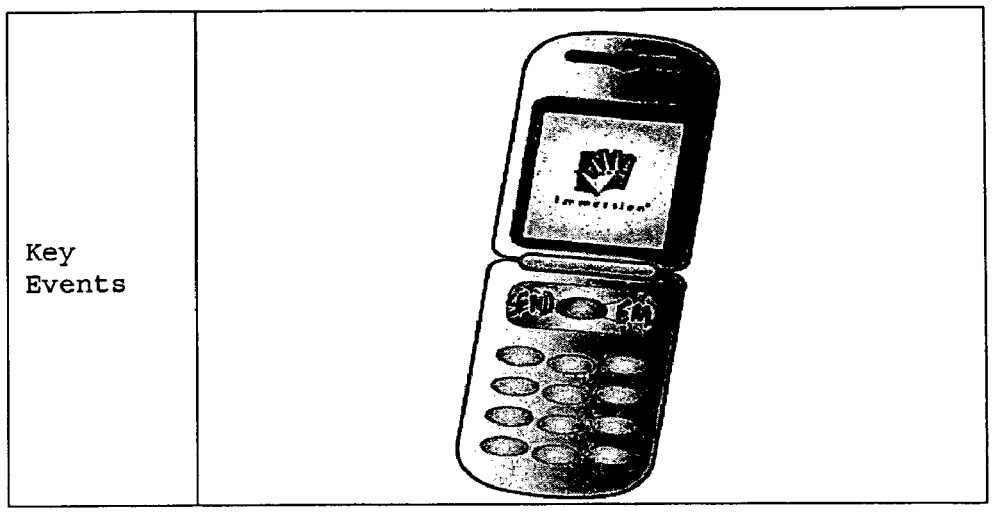

In FIG. 10G, dedicated keys, such as Send and End, may have a specific haptic navigation effect associated with them that will confirm the button press. Keys that do not have a dedicated function should not directly trigger a VibeTonz navigation effect. Instead, the navigation effect should be based on the context of the button press in the application to avoid interfering with other applications.

There are many possibilities for creating favorites, including items that are manually marked by the user and items that an application may programmatically classify as a favorite. An example of programmatically created favorites could be an enhanced contact application, wherein the first contact for every letter of the alphabet is marked as a favorite. In this way as a user scrolls through the alphabetized list he could feel that he has now reached the section beginning with "B", then "C" and so on.

The source of a user-interface navigation event may be related to the medium that is navigated (e.g. the type of menu or list), the type of item being selected (e.g. "Mark" v. "Kathy"), or the consequence of using a dedicated key (e.g. Send v. Save).

In accordance with another embodiment of the present invention, the input signal may be associated with a reminder event, which may be a self-generated message on the handheld communication device serving as a reminder for a pre-scheduled activity (e.g., an appointment or a meeting). The source in this scenario may be associated with the type of a pre-scheduled activity (e.g., a business meeting vs. a restaurant reservation), or the time at which the pre-scheduled activity takes place.

In accordance with one embodiment of the present invention, the input signal may include a communication signal associated with a handheld communication device power signature event.

In accordance with another embodiment of the present invention, the input signal may include a communication signal associated with a status event, for example, received via antenna 150 and transceiver 160 of FIG. 1. Examples of a status event include, but are not limited to: an advertisement (e.g., sale) event, a one-to-one marketing event, a business-transaction event, a stock-trading event, a weather-forecast event, a sports (or game) event, an entertainment event, and an emergency (e.g., 911) event. In this scenario, the source may be associated with a characteristic that distinctly identifies the sender and/or the nature of a status event, such as the phone number of the handheld user's stock broker, the e-mail address of the user's favorite store, the logo associated with the user's favorite TV or radio station, and so on.

In accordance with yet another embodiment of the present invention, an event of interest can be accompanied by a distinct haptic effect, or overlapping haptic effects, conveying to the user customized information such as "who is calling," "what is happening," and so on. The user can also be allowed to update the haptic lookup table, e.g., to include new events, and/or to modify the mappings between the existing events of interest and the corresponding haptic effects.

Moreover, a specific haptic effect can be assigned to any incoming signal event whose source is unknown, so as to alert the user that the incoming message is from an un-identifiable or sender.

As used herein, the term "handheld communication device" includes, without limitation, a mobile phone such as a cellular phone or a satellite phone, a personal digital assistant (PDA), a cordless telephone, a pager, a two-way radio, a handheld or portable computer, a game console controller, a personal gaming device, an MP3 player, or other personal electronic devices known in the art that are equipped with communication or networking capabilities.

In accordance with one embodiment of the present invention, the aforementioned haptic effects can be used as haptic ringers (e.g., counterparts to auditory ring tones) that are customized or personalized to convey information to the user about various events of interest. By way of example, a haptic ringer associated with a call from a loved one (e.g., the user's spouse) may comprise low-amplitude and high frequency vibrations that impart gentle sensations to the user. In contrast, a haptic ringer associated with an emergency event (such as a 911-call) may comprise jolt-like pulses that impart pounding sensations to the user.

In contrast with conventional auditory ring tones, the aforementioned haptic effects (e.g., haptic ringers) are more desirable in an environment where extraneous auditory signals are prohibited (e.g., during a meeting or a concert), and/or where it is difficult to distinguish auditory signals (e.g., in a loud environment such as an airport). The haptic ringers are also more suitable in distracting situations such as driving, so that the user of a handheld communication device can keep eyes on the road without having to look at the device. Moreover, such haptic ringers convey customized information to the user, so that the user is aware of "who is calling," "what is happening," and so on, as the following examples further illustrate.

A handheld communication device such as a mobile phone may be configured to allow a user to include haptic information or a haptic code in an outgoing communication signal, e.g., carrying a voice call, an e-mail, or a message. The encoding of a communication signal with haptic information may be based on an established scheme or protocol, and/or on a per-system basis. The haptic code is configured to cause a haptic effect to be output when the communication signal is delivered to another handheld communication device. In one embodiment, businesses and organizations may each be associated with a distinct haptic logo (e.g., a particular vibration pattern) and include their haptic logos in various messages sent to the handheld communication devices of their customers. Such haptic logos can serve as counterparts to conventional logos known in the art, for example. Various status events mentioned above may also be transmitted in this manner. By way of example, a merchant may include its haptic logo in various advertisement events and business transaction events to be transmitted to the handheld communication devices of its customers. Stock brokers (or brokerage firms), TV or radio stations, and marketing/advertising agencies may likewise include their haptic logos in various stock-trading events, weather-forecast events, sports events, entertainment events, and one-to-one marketing events to be transmitted to the handheld users.

Figure 3:
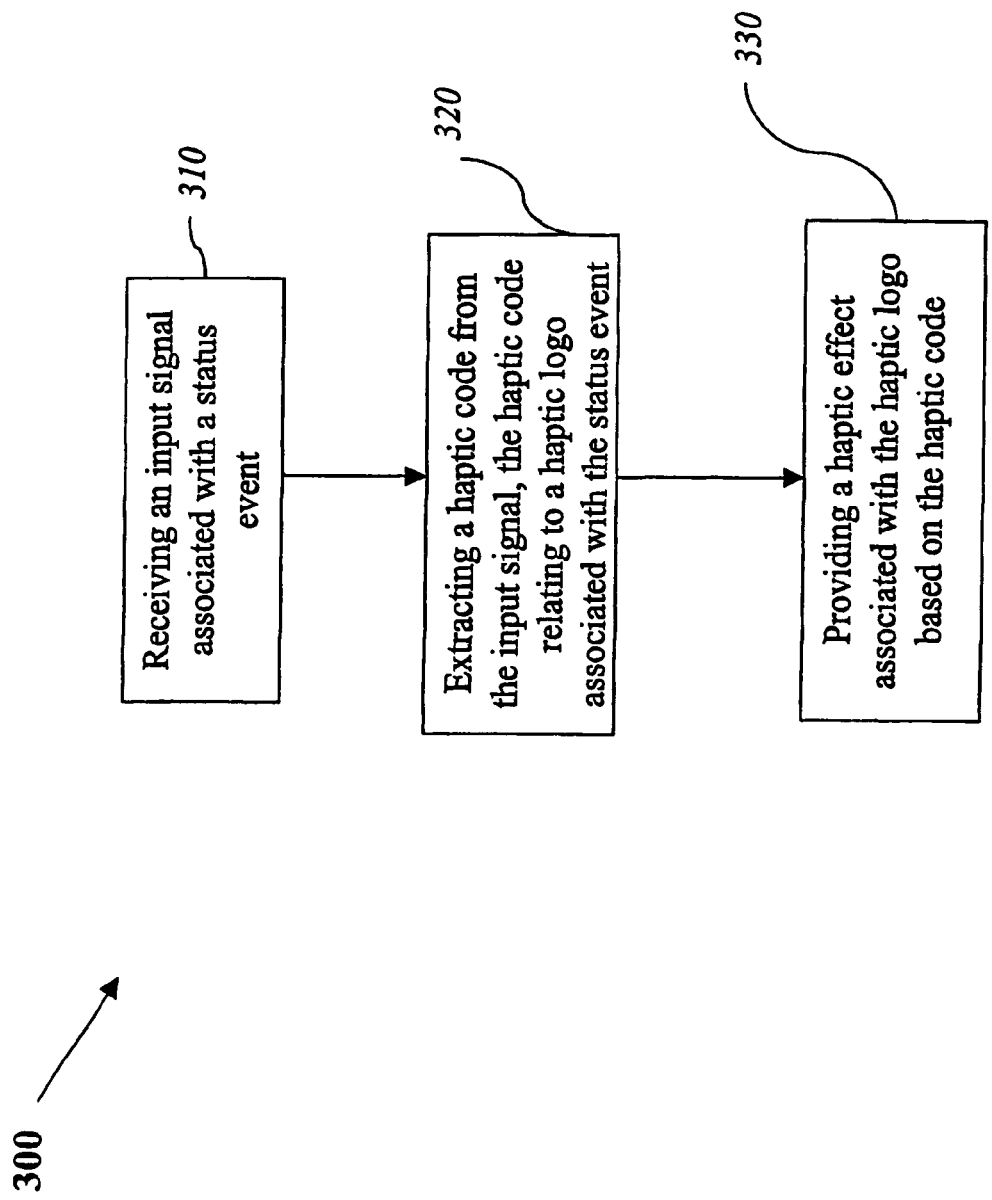
FIG. 3 is a flowchart depicting a method for using haptic logos to relate information to users of handheld communication devices in accordance with an embodiment of the present invention.

FIG. 3 is a flowchart 300 depicting a method of using haptic logos to relate information to users of handheld communication devices, according to an embodiment of the invention. A handheld communication device receives an input signal at step 310, the input signal being associated with a status event. The handheld communication device extracts a haptic code from the input signal at step 320, where the haptic code is associated with a haptic logo. At step 330, the handheld communication device provides a haptic effect associated with the haptic logo. Step 330 may include providing a control signal to an actuator coupled to the handheld communication device, where the control signal is based at least in part on the haptic code and configured to cause the actuator to output the haptic effect.

In accordance with one embodiment of the present invention, the extracted haptic code may be directly applied to the actuator for rendering the desired haptic effect. In another embodiment, the haptic code may be configured according to a predetermined scheme or protocol that includes, for example, a table of haptic codes (some of which may be associated with one or more haptic logos) versus control signals for rendering the corresponding haptic effects. In this way, a processor in the handheld communication device can look up the corresponding control signal from the table based on the extracted haptic code, and output the selected control signal to the actuator for rendering the desired haptic effect.

In the embodiments illustrated in FIG. 2 or 3, the handheld communication device (or the haptic code) may be programmed such that the haptic effect is output immediately, or at a prescribed time after receiving the input signal, as desired in applications. The haptic effects can also be triggered by, or synchronized with, other occurrences.

A handheld communication device may be further configured such that some of its user-interface members (such as those described above) are each associated with a haptic code, e.g., according to a predetermined scheme or protocol. In one embodiment, some of these haptic codes may be associated with haptic effects that emulate expressions or behaviors, such as "laugh," "giggle," "hug," "high-five," "heartbeat," "pet purring," etc. This allows haptic effects to be transmitted and experienced, e.g., in an interactive conversation or a chat session, by pressing or manipulating such members.

By way of example, suppose that user A (termed "Alice" herein) is engaged in a chat session with user B (termed "Bob" herein) via their respective mobile phones. In one embodiment, when Bob tells Alice a joke, Alice can respond by sending a "laugh" sensation to Bob, e.g., by pressing a key on her mobile phone that is assigned with a haptic code corresponding to a laugh sensation. This causes a signal to be transmitted from Alice's phone to Bob's phone, and a corresponding haptic effect to be output to Bob's phone (and thereby experienced by Bob). In accordance with alternative embodiments, Alice can include a haptic code in an outgoing message (which may also contain a video image such as a picture taken by her mobile phone, and/or a graphical feature such as an emoticon emulating a smiley face) to be transmitted to Bob, e.g., by pressing the corresponding user-interface member. The haptic code causes a haptic effect to be output when the message is delivered to a remote device such as Bob's mobile phone. In accordance with one embodiment, the haptic effect may be correlated or synchronized with the displaying of a video image contained in the message. In accordance with another embodiment, the generation of the haptic effect based on the haptic code may be carried out in a manner similar to that described above with respect to the embodiment of FIG. 3.

Figure 4:
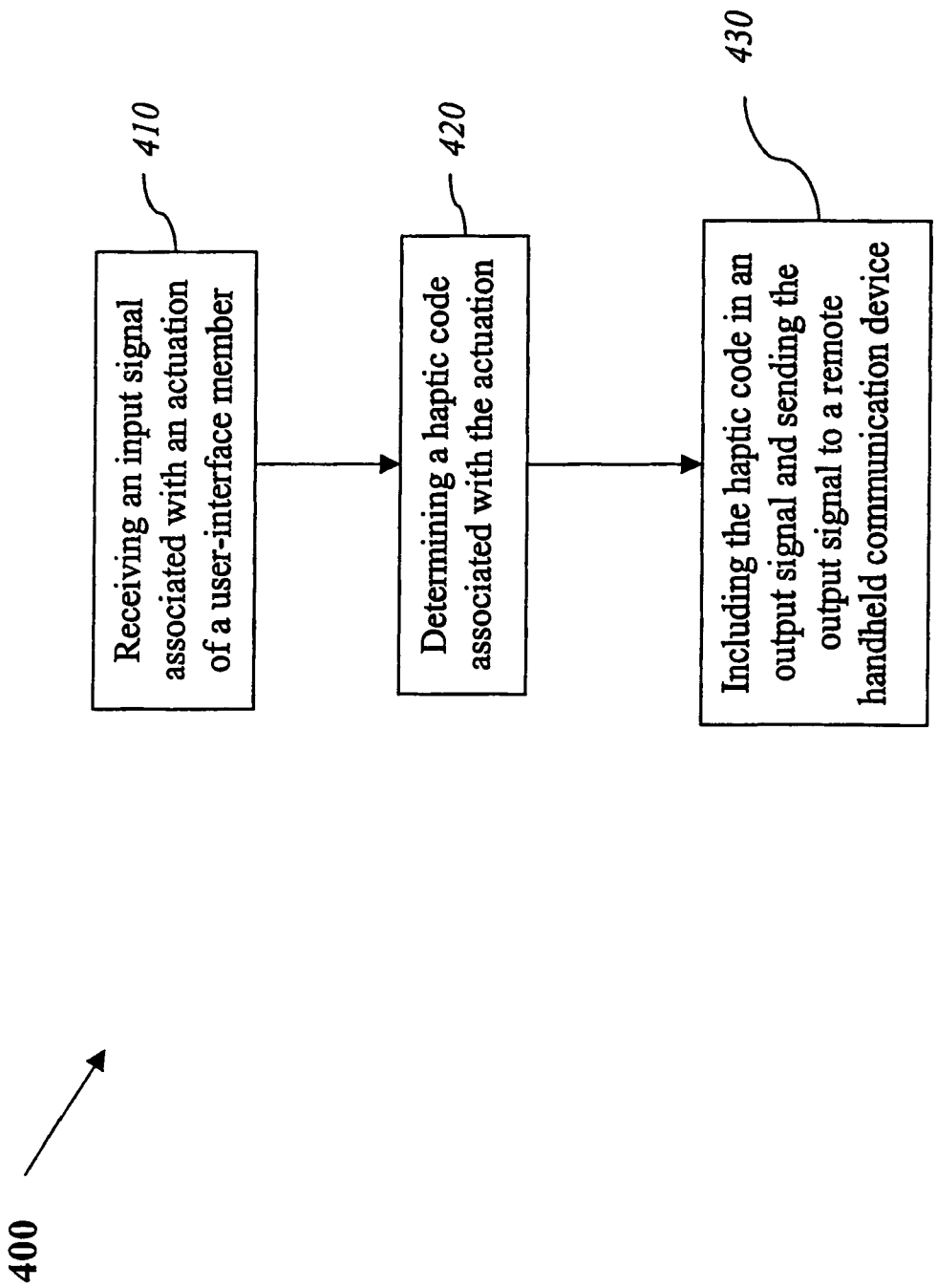
FIG. 4 is a flowchart depicting a method for haptically encoding communication signals in accordance with one embodiment of the present invention.

FIG. 4 depicts a flowchart 400 illustrating a method of a method of haptically encoding communication signals, according to an embodiment of the invention. At step 410, an input signal associated with an actuation of a user-interface member is received. By way of example, the input signal may be associated with Alice's pressing or manipulating a particular user-interface member. At step 420, a haptic code associated with the actuation is determined. At step 430, the haptic code is included in an output signal, and the output signal is sent to a remote handheld communication device. As described above, the output signal may also include a message, a video image, and/or a graphical feature.

Figure 5:
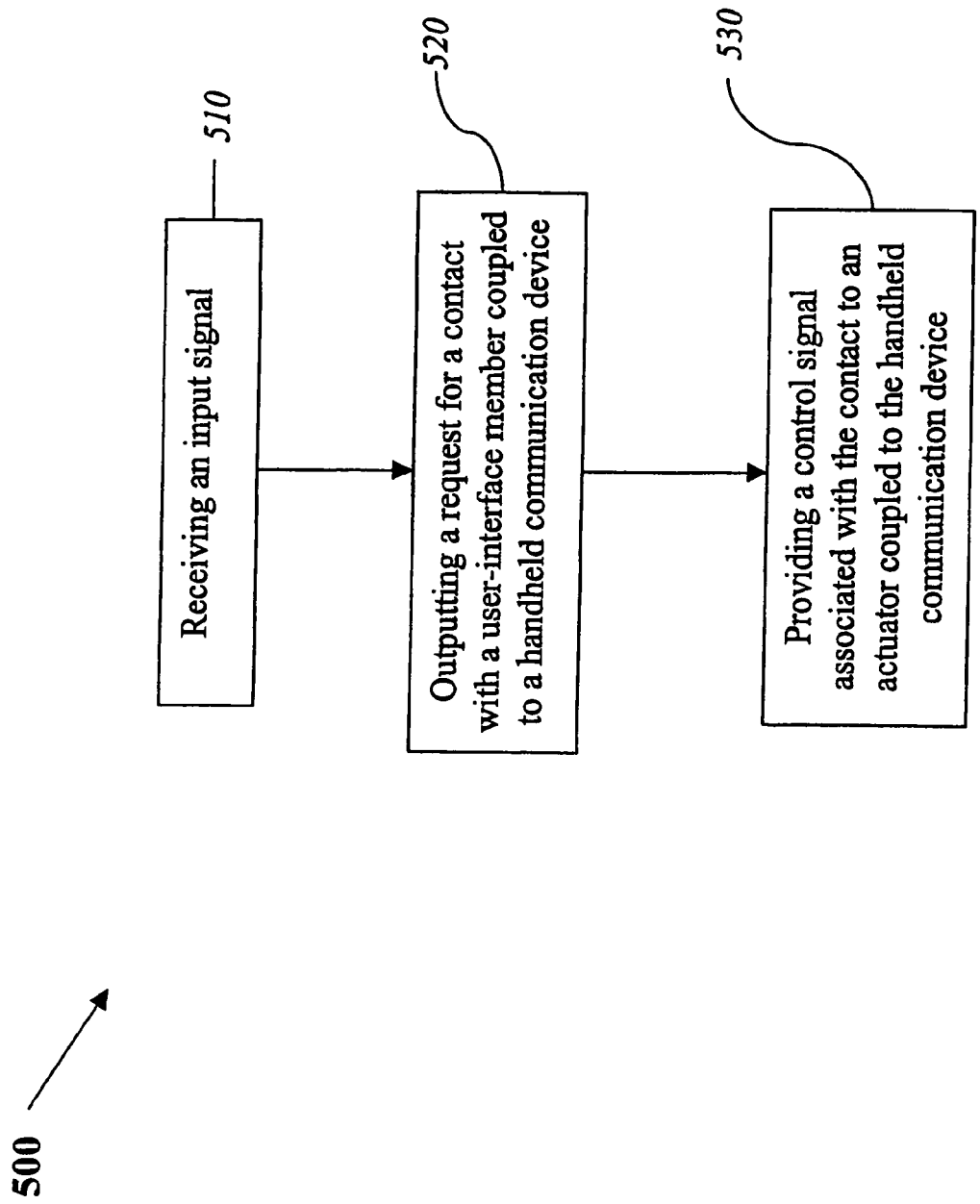
FIG. 5 is a flowchart depicting a method for providing haptic messaging to users of handheld communication devices in accordance with one embodiment of the present invention.

A handheld communication device may also be configured such that a haptic effect, along with a message, is output upon a contact with a user-interface member being made (e.g., by a user or an input device). FIG. 5 depicts a flowchart 500 illustrating a method of haptic message that can be associated with this situation, according to an embodiment of the invention. At step 510 of the flowchart 500, a handheld communication device receives an input signal. At step 520, the handheld communication device outputs a request for a contact with a user-interface member coupled to the handheld communication device. At step 530, the handheld communication device provides a control signal associated with the contact to an actuator coupled to the handheld communication device. The control signal is configured to cause the actuator to output a haptic effect associated with the input signal. Step 520 may include having a visual effect displayed, an auditory effect played, and/or a distinctive haptic ringer output, which requests a contact with the user-interface member being made.

In accordance with one embodiment, the input signal in FIG. 5 may include a haptic code, along with a message, a video image, and/or a graphical feature, etc. For example, the haptic code may be configured to cause a "hug" sensation to be output when the video image contained in the input signal is displayed. The input signal may also contain a provision or protocol that specifies that the incoming message along with the corresponding haptic effect is output upon a contact with a particular user-interface member (e.g., the #5 key) being made. Alternatively, the handheld communication device may determine the user-interface member to be contacted, before outputting incoming message along with the corresponding haptic effect.

In accordance with another embodiment, the input signal of FIG. 5 may be associated with a "virtual touch," e.g., to mimic a handshake, a "high-five," a pat on the back, a pulse or heartbeat sensation, a pet purring sensation, or other touch sensations associated with human (and/or human-animal) interactions. In one scenario, the input signal at step 510 may include a "virtual touch indicator," based on which the request for a contact with a particular user-interface member is made. The virtual touch indicator may be in the form of a haptic code, a message, or other informative means. The control signal at step 530 may be generated, e.g., based on the virtual touch indicator, a haptic code associated with the user-interface member at play, or other predetermined scheme. The input signal at step 510 may also include a virtual touch indicator along with a virtual touch signal for rendering the desired haptic effect. In this case, the control signal at step 530 may be based on the virtual touch signal.

Referring back to the chat session between Alice and Bob, by way of example at the end of their chat session, Alice may wish to send Bob a "high-five." She sends to Bob's mobile phone a signal including a virtual touch indicator, which in turn prompts a request that Bob be in contact with a user-interface member coupled to his phone, such as a direction pad (e.g., by putting his fingers on the individual keys of the direction pad), a key pad, a touch screen, a trackball, a joystick, or the like. The control signal for rendering a haptic effect that emulates a "high-five" may be based on the haptic code associated with the user-interface member, transmitted with the input signal from Alice, and/or other predetermined scheme.

Figure 6:
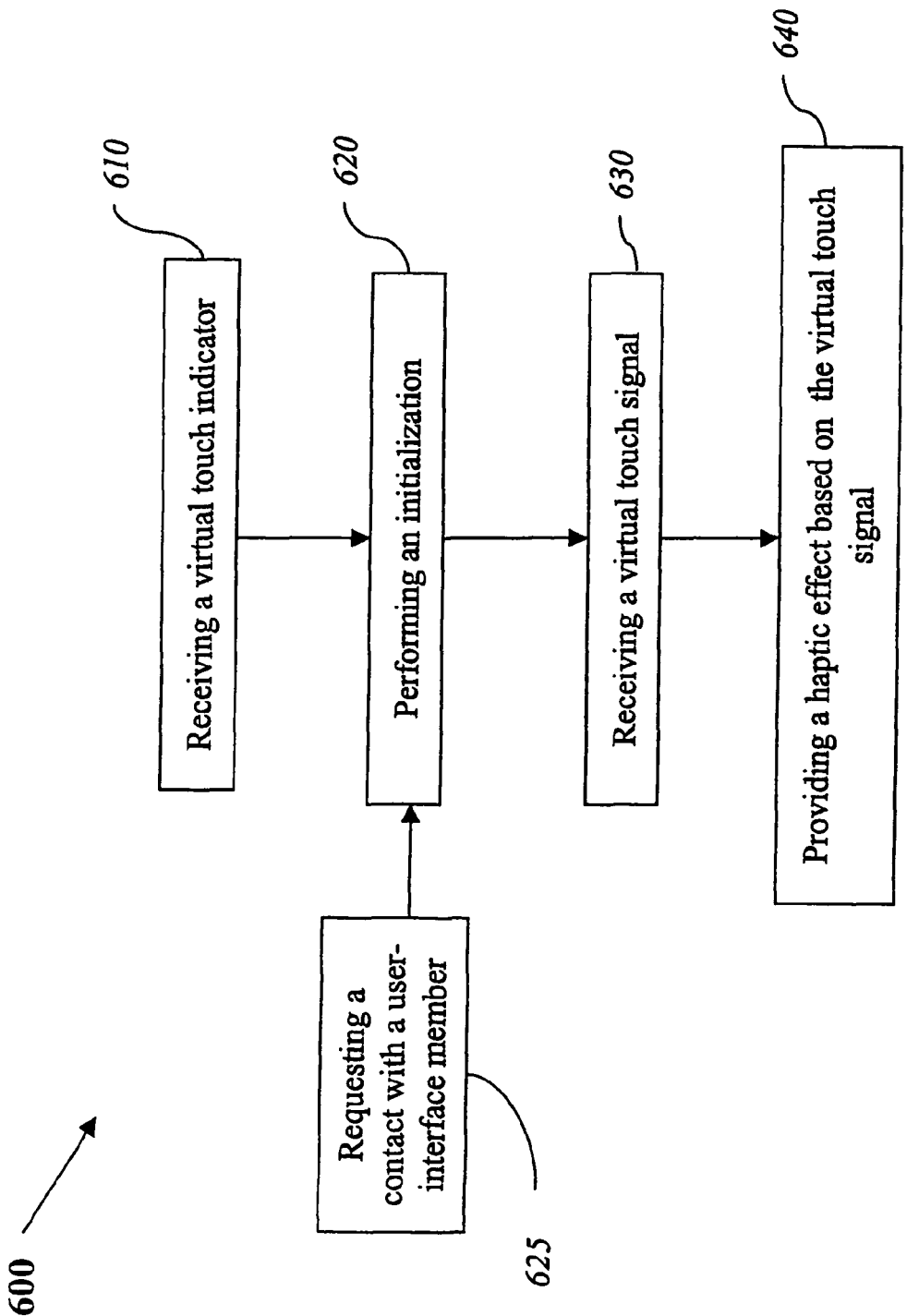
FIG. 6 is a flowchart illustrating a method for providing an interactive virtual touch in accordance with one embodiment of the present invention.

Interactive virtual touch can also be engaged between users of handheld communication devices, where the manipulation of a user-interface member on one handheld communication device is transmitted possibly in substantially real-time to another handheld device and experienced by its user, and vice versa. FIG. 6 depicts a flowchart 600 illustrating a method of providing interactive virtual touch in one embodiment of the present invention. In the embodiment shown, a handheld communication device first receives an input signal including a virtual touch indicator at step 610. A distinctive haptic ringer may, for example, accompany the arrival of the virtual touch indicator, identifying the sender and the nature of the input signal. The handheld communication device may then perform any necessary initialization to enable the communication at step 620, which may also include requesting a contact with a particular user-interface member coupled to the handheld communication device at step 625. The handheld communication device subsequently receives a virtual touch signal in the communication associated with the desired haptic effect at step 630. The handheld communication device provides the haptic effect at step 640, e.g., by applying the virtual touch signal to an actuator coupled to the user-interface member.

In accordance with one embodiment, the virtual touch signal may be associated with the manipulation of a user-interface member on a remote handheld device and transmitted in substantially real-time. And the user on the receiving end may respond by acting in a similar fashion, so as to emulate an interactive touch. Any schemes for delivering virtual touch to users of handheld communication devices may be used.

Figure 7:
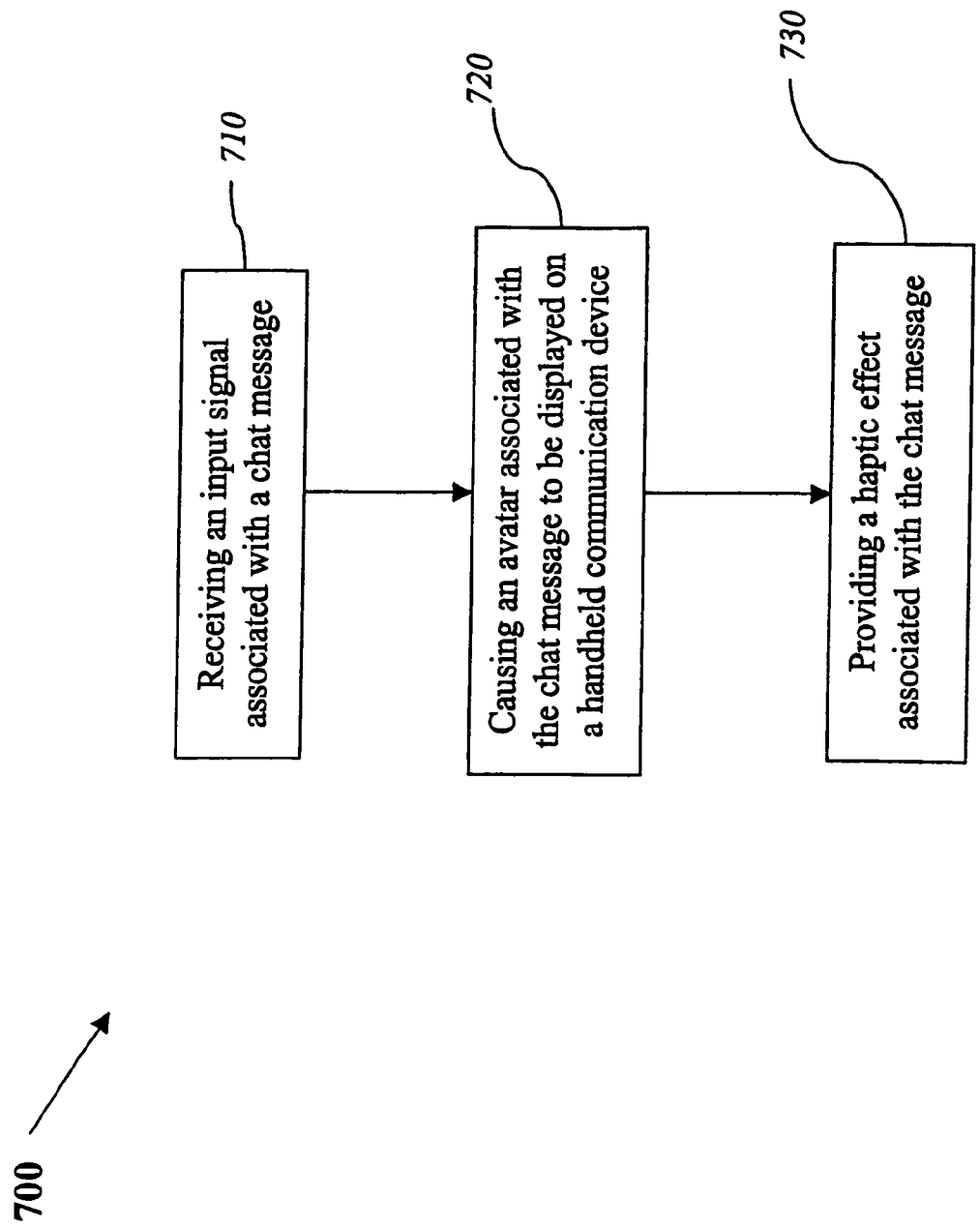
FIG. 7 is a flowchart illustrating a method for carrying out a chat session using handheld communication devices in accordance with one embodiment of the present invention.

Haptic effects can also be used to enhance and complement the information content communicated between handheld communication devices. In accordance with one embodiment, a plurality of handheld communication users may be engaged in a chat session via their handheld communication devices. The users may each have a graphical representation or avatar displayed on other handheld communication devices. Such avatars can also be haptically enabled, for example, whereby their expressions and/or behaviors are accompanied and enhanced by corresponding haptic effects. FIG. 7 is a flowchart 700 depicting a method of carrying out a chat session using handheld communication devices, according to an embodiment of the invention. In the embodiment shown, a handheld communication device receives an input signal associated with a chat message at step 710. The handheld communication device displays an avatar associated with the chat message at step 720. The avatar may be shown on display 170 of FIG. 1, in one embodiment. At step 730, the handheld communication device provides a haptic effect associated with the chat message. Step 730 may include outputting a control signal to an actuator coupled to the handheld communication device, where the control signal is configured to cause the actuator to output the haptic effect. In accordance with one embodiment, the haptic effect may be correlated with an expression or behavior of the avatar, such as a laugh or giggle, a cry, a pet purring, or the like.

Figure 8:
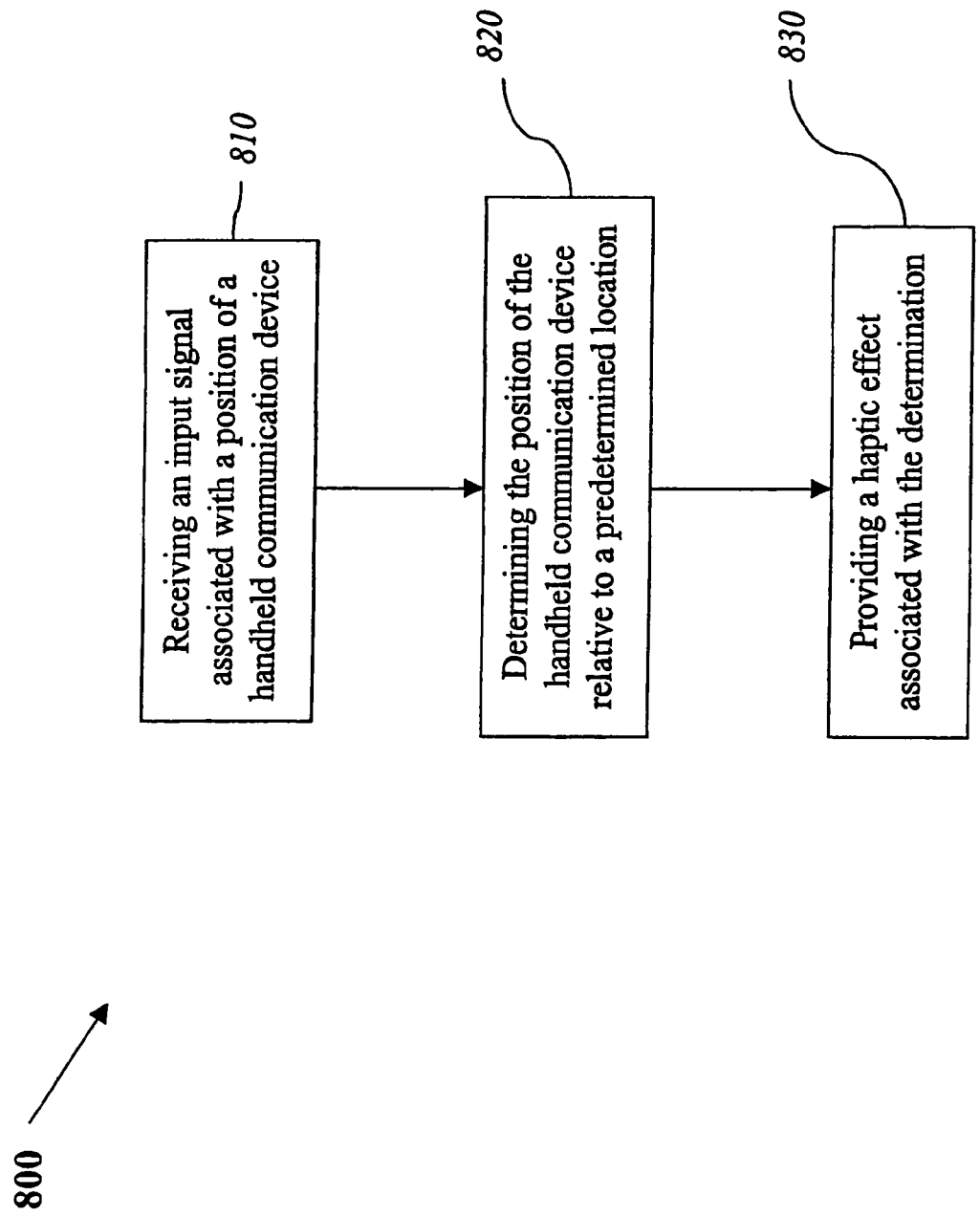
FIG. 8 shows a flowchart depicting a method for using haptic effects to relate navigation information in accordance with one embodiment of the present invention.

Handheld communication devices are increasingly equipped with navigation capability, for example, in communication with the Global Positioning System (GPS) or other navigation systems. Haptic effects can also be used to convey navigation information, such as positional and/or directional information, to handheld users. By way of example, FIG. 8 shows a flowchart 800 depicting a method of haptic navigation, according to an embodiment of the present invention. The flowchart 800 discloses receiving an input signal associated with a position of a handheld communication device at step 810; determining the position of a handheld communication device relative to a predetermined location at step 820; and providing a haptic effect associated with the determination at step 830. Step 830 may include outputting a control signal associated with the determination to an actuator coupled to the handheld communication device, the control signal being configured to cause the actuator to output the haptic effect. Further, the input signal at step 810 may be received from GPS, a digital compass, or other navigation systems known in the art.

In accordance with one embodiment, the haptic effect may be associated with a distance between the position of the handheld communication device and a predetermined location (termed "destination" herein). For example, the haptic effect may include a vibration having a magnitude and a frequency, where at least one of the magnitude and the frequency decreases as the distance from the destination diminishes. Additionally, the haptic effect may be configured to convey a quantitative measure of the distance. By way of example, the haptic effect may include one or more pulse or jolt sensations, where the number of pulses is proportional to the number of miles between the position of the handheld device and the destination.

Processors described above (including processor 120 of FIG. 1) can include, for example, one or more digital logical processors capable of processing input, execute algorithms, and generate output as necessary to perform various tasks, such as those described above. Such processors/controllers may include a microprocessor, an Application Specific Integrated Circuit (ASIC), state machines and the like. Such processors include, or may be in communication with, media (including memory 140 of FIG. 1). Such media include, for example, computer readable media, which stores program code that, when executed by a processor, cause the processor to perform the steps described herein. Embodiments of computer-readable media include, but are not limited to, an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

Program code and associated application programs related to various applications may also reside on a remote source, such as a network resource, a Web server, a remote handheld communication device or computer, which can be transmitted or downloaded to a handheld communication device on a regular or predetermined basis. Haptic effects (along with associated control signals) can also be downloaded or transmitted from a remote source, as described above.

Actuators described above (including actuator 130 shown in FIG. 1) can include, for example, a pager motor, an eccentric rotating motor, a harmonic eccentric rotating motor, a voice coil, a solenoid, a resistive actuator, a piezoelectric actuator, an electro-active polymer actuator, or other types of active/passive actuators suitable for generating haptic effects. U.S. Pat. Nos. 6,429,846 and 6,424,333 disclose further details relating to some of these actuators, both of which are incorporated in full herein by reference. In some embodiments, one or more actuators may be implemented in a handheld communication device, configured to deliver appropriate haptic effects. It will be appreciated that various control schemes can be devised accordingly, for controlling the actuator(s) in a manner that best achieves the desired haptic effects.

Referring back to FIG. 1, actuator 130 may be coupled to housing 110, thereby imparting haptic effects thus generated to the device body. Haptic ringers (or alerts) described above may be delivered in this manner, for instance. In another embodiment, actuator 130 may be coupled to user-interface 112 of the device body. For instance, an active and/or resistive actuator can be coupled to user-interface 112 to deliver a virtual touch described above. One or more actuators can also be coupled to user-interface 112, for example, to convey a virtual touch such to a user. In yet another embodiment, a plurality of actuators can be coupled to housing 110 as well as user-interface 112. In addition, one or more actuators may also be coupled to a headset, a wristband, or other accessory means associated with a handheld communication device.

Embodiments of the invention include the following.

In accordance with one embodiment of the present invention, an individual (or "Bob") can have a mobile phone according to the invention. The mobile phone also has an e-mail capability, for example, including both "receive" and "send"). The mobile phone is configured to provide a plurality of haptic effects, e.g., by including appropriate hardware (such as actuators described above) and program code. Bob can program the mobile phone, for example, via user-interface 112 through API 150 shown in FIG. 1, by inputting various events of interest and associating each with a distinct haptic effect. Thus, when an event of interest is subsequently received, the mobile phone provides the corresponding haptic effect.

In accordance with one embodiment of the present invention, Bob's phone includes programming that provides a first haptic effect when an input signal is received from the mobile phone of Bob's wife (or "Alice"). Bob's phone also includes programming that provides a second haptic effect that is different and distinct from the first haptic effect, when an input signal is received from the mobile phone of Bob's supervisor at work (termed "Carol" herein). Bob's phone is further be configured to provide a third haptic effect that is different from the two mentioned above, e.g., when an e-mail is received from the e-mail address of Bob's stock broker (where the e-mail contains a "smiley-face" emoticon, for instance). The third haptic effect can be a vibration with high magnitude and short duration, e.g., to emulate a "high-five."

In accordance with another embodiment of the present invention, Bob can be watching a movie in a theater with his mobile phone in his pocket. It is set to make no noise, because Bob is in a theater. While Bob is watching the movie, Bob's mobile phone vibrates with the second haptic effect mentioned above. Bob chooses to ignore the call, because he does not wish to speak with his supervisor at a movie theater. Later, Bob's mobile phone vibrates with the first haptic effect. Bob wants to speak with Alice, for example, to make plans to meet later. So Bob answers the phone and quickly exits the theater to talk with Alice.

Bob's mobile phone can also include a personal schedule/calendar application. After speaking with Alice, Bob can enter an entry in the calendar at the 7:00 PM time mark—"Meet Alice". "Meet Alice". Bob can also choose a fourth haptic effect to associate with the calendar entry. The mobile phone can be programmed to output the fourth haptic effect fifteen minutes before the time entry of the calendar (i.e., at 6:45 PM).

Bob's mobile phone can be equipped with GPS capability, along with an associated application program for location determination. Bob can also store addresses of various locations of interest in the application program. In one embodiment, Bob can be on the road. Bob's mobile phone vibrates with a distinct fifth haptic effect. Bob recognizes the fifth haptic effect being associated with the haptic logo of his favorite electronics store. He then checks with the application program, and receives a sixth haptic effect associated with the distance between his current position and the store location. Bob then decides to make a stop at the store.

A haptically-enabled handheld communication device of the invention may be further used as a two-way haptic remote control, for example, for controlling a remote system such as a Television set or a multimedia system. In one embodiment, the events as referred to above may be related to program channels shown on the remote system, each identified by a channel number (which may be used as the "source"), for instance. The corresponding haptic effects may be customized on a per-channel basis. Such haptic effects can serve to inform a user as to which channel is on, as a user is channel-surfing by way of this haptic remote control, so that the user need not to look up the display screen.

Figure 9:
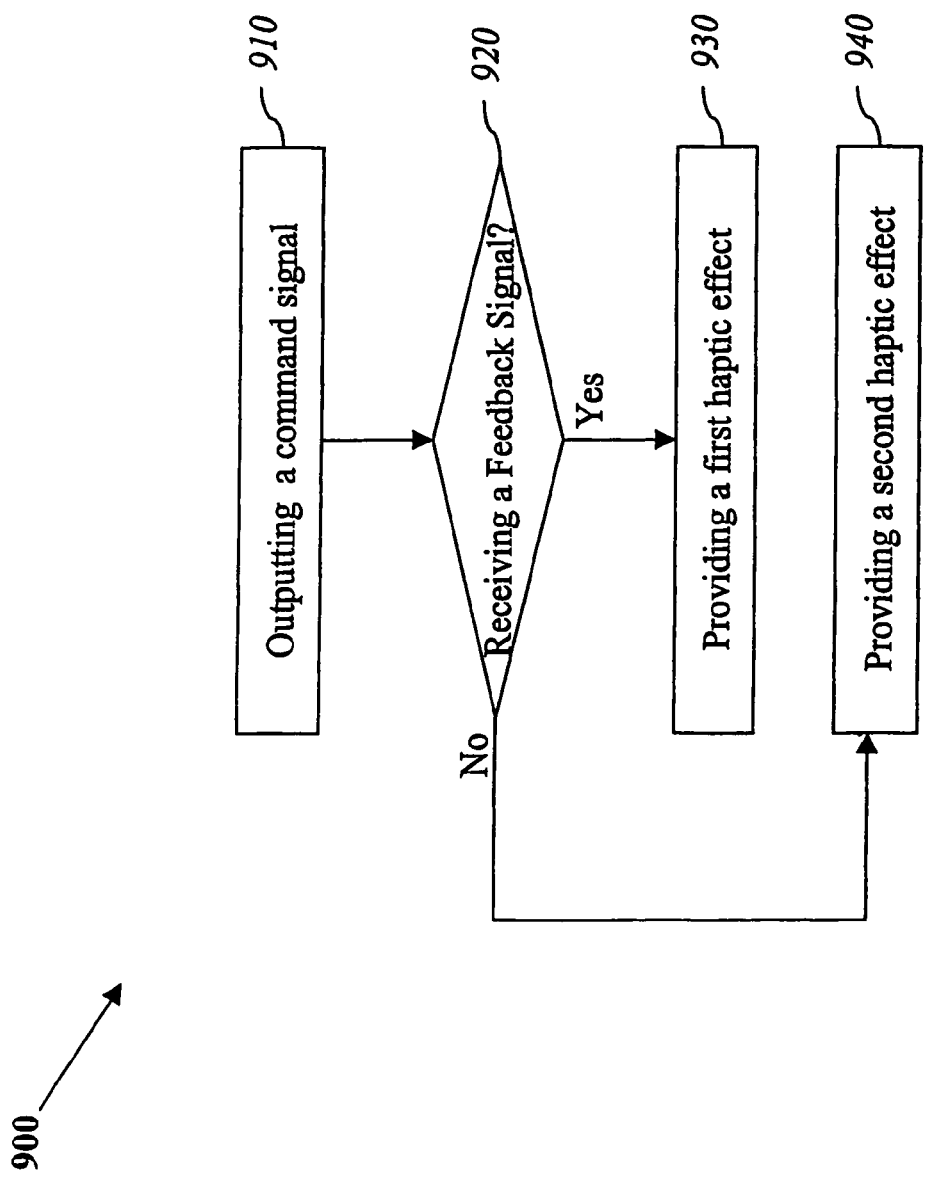
FIG. 9 is a flowchart illustrating a method for providing haptic effects to a remote control in accordance with one embodiment of the present invention.

FIG. 9 depicts a flowchart illustrating a method for providing haptic effects to a remote control in one embodiment of the present invention. In the embodiment shown, the remote control sends a command signal to a remote system at step 910. As with a conventional remote control, the signal may or may not reach the television. The remote control then determines whether a feedback signal has been received at step 920. If the remote control receives a feedback signal, the remote control provides a first haptic effect at step 930. If not, the remote control provides a second haptic effect at step 940.

The first haptic effect can be further customized according to the received feedback signal. In one embodiment, the remote system provides information (e.g., via the feedback signal) to the remote control regarding the state of the display, e.g., based on a predetermined scheme. The remote control may use the information to determine a corresponding haptic effect to provide at step 930. In alternative embodiments, the remote system may determine the appropriate haptic effect to provide and include a corresponding haptic code in the feedback signal. The remote control provides the haptic effect at step 930 based on this haptic code.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method, comprising:
   receiving an input signal associated with a connection event over a carrier service network at a communication device, the connection event representative of a connection status of the communication device over the carrier service network after a communication has been established using the communication device on the carrier service network; and
   outputting a control signal to an actuator coupled to the communication device, the control signal configured to cause the actuator to output a haptic effect associated with the connection event, wherein the haptic effect is capable of being physically felt by a user in contact with the communication device.

2. The method of claim 1 further comprising determining a source of the connection event and selecting the control signal based at least in part on the determination.

3. The method of claim 1 wherein the input signal includes a haptic code, the method further comprising extracting the haptic code from the input signal, the control signal being based at least in part on the haptic code to cause the communication device to output the haptic effect from the input signal.

4. The method of claim 1 wherein the haptic effect is output to a handheld communication device.

5. The method of claim 1 wherein the connection event comprises a sending of an outgoing e-mail, a sending of an outgoing SMS message, a dropped call, or a passage of an increment of time when connected to a call.

6. The method of claim 1 wherein the connection event is a connected call.

7. A non-transitory computer readable medium for execution by a machine and when executed configuring the machine to:
   associate an input signal received at a communications device with a connection event stored in a memory of a communication device and wherein the connection event is representative of a connection status of the communications device a communication has been established using the communications device; and
   output a control signal to an actuator coupled to the communications device, the control signal configured to cause the actuator to output a haptic effect associated with the connection event, wherein the haptic effect is capable of being felt by a user physically in contact with the communications device.

8. The non-transitory computer readable medium of claim 7 further configuring the machine to determine a source of the connection event and selecting the control signal based at least in part on the determination.

9. The non-transitory computer readable medium of claim 7 further configuring the machine to extract a haptic code from the input signal, the control signal being based at least in part on the haptic code.

10. The non-transitory computer readable medium of claim 7 further configuring the machine to generate a plurality of control signals, each control signal being associated with a haptic effect.

11. The non-transitory computer readable medium of claim 7 wherein the connection event comprises an outgoing e-mail, a sending of an outgoing SMS message, a dropped call, or a passage of an increment of time when connected to a call.

12. The non-transitory computer readable medium of claim 7 wherein the connection event is a connected call.

13. A handheld communication device, comprising:
   a processor configured to receive an input signal associated with a connection event over a carrier service network connected to the communication device, the connection event representative of a connection status of the communication device over the carrier service network after a communication has been established using the communication device over the carrier service network; and an actuator within a body of the communication device and coupled to the processor, wherein the actuator is configured to output a haptic effect upon receiving a control signal associated with the connection event from the processor, the haptic effect capable of being felt by a user in physical contact with the apparatus.

14. The device of claim 13 wherein the handheld communication device is a mobile phone.

15. The device of claim 13 further comprising a memory coupled to the processor, wherein the memory is configured to determine a source of the connection event and select the control signal based at least in part on the determination.

16. The device of claim 15 wherein the memory further stores a haptic lookup table, the selection being based on the haptic lookup table.

17. The device of claim 13 wherein the connection event comprises a sending of an outgoing e-mail, a sending of an outgoing SMS message, a dropped call, or a passage of an increment of time when connected to a call.

18. The device of claim 13 wherein the connection event is representative of the connection status between the communication device and another communication device.

19. The device of claim 13 wherein the connection event is a connected call.

20. A method, comprising:

receiving an input signal associated with a connection event over a carrier service network at a communication device, the connection event representative of a connection status of the communication device over the carrier service network, wherein the connection event comprises a push-to-talk ready alert, a push-to-talk receiving alert, or a push-to-talk busy alert, wherein push-to-talk comprises a half-duplex communication that travels in one direction at a given moment; and outputting a control signal to an actuator coupled to the communication device, the control signal configured to cause the actuator to output a haptic effect associated with the connection event, wherein the haptic effect is capable of being physically felt by a user in contact with the communication device.

* * * * *